(12) United States Patent
Johnson, Sr.

(10) Patent No.: US 8,701,774 B2
(45) Date of Patent: Apr. 22, 2014

(54) HYDRAULIC FRACTURING

(75) Inventor: William L. Johnson, Sr., Grove, OK (US)

(73) Assignee: Ecopuro, LLC, Denver, CO (US)

( * ) Notice: Subject to any disclaimer, the term of this patent is extended or adjusted under 35 U.S.C. 154(b) by 291 days.

(21) Appl. No.: 13/167,683

(22) Filed: Jun. 23, 2011

(65) Prior Publication Data

US 2011/0272156 A1 Nov. 10, 2011

Related U.S. Application Data

(63) Continuation-in-part of application No. 12/572,942, filed on Oct. 2, 2009, which is a continuation-in-part of application No. 12/412,357, filed on Mar. 26, 2009, now abandoned.

(60) Provisional application No. 61/357,586, filed on Jun. 23, 2010, provisional application No. 61/070,876, filed on Mar. 26, 2008.

(51) Int. Cl.
*C09K 8/62* (2006.01)
*C09K 8/68* (2006.01)
*C09K 8/76* (2006.01)
*C09K 8/80* (2006.01)
*C08K 3/34* (2006.01)
*C08K 3/40* (2006.01)
*E21B 43/26* (2006.01)

(52) U.S. Cl.
USPC ........ 166/308.2; 507/200; 507/203; 507/219; 507/269; 524/492; 524/493; 524/494; 166/305.1; 166/308.1

(58) Field of Classification Search
USPC .......... 507/200, 203, 219, 269; 524/492, 493, 524/494; 166/305.1, 308.1, 308.2
See application file for complete search history.

(56) References Cited

U.S. PATENT DOCUMENTS

| | | | |
|---|---|---|---|
| 3,408,296 A | 10/1968 | Kuhn et al. | |
| 4,038,112 A | 7/1977 | Asaoka | |
| 4,302,341 A | 11/1981 | Watson | |
| 4,304,300 A | 12/1981 | Watson | |
| 5,789,352 A | 8/1998 | Carpenter et al. | |
| 6,364,018 B1 * | 4/2002 | Brannon et al. | 166/280.2 |
| 6,644,844 B2 | 11/2003 | Neal et al. | |
| 6,921,789 B2 | 7/2005 | Booth et al. | |
| 7,122,509 B2 | 10/2006 | Sanner et al. | |
| 7,299,874 B2 | 11/2007 | Welton et al. | |
| 7,299,876 B2 | 11/2007 | Lord et al. | |
| 7,328,744 B2 | 2/2008 | Taylor et al. | |
| 7,350,573 B2 | 4/2008 | Reddy | |
| 7,351,681 B2 | 4/2008 | Reddy et al. | |
| 7,380,602 B2 | 6/2008 | Brady et al. | |
| 7,380,606 B2 | 6/2008 | Pursley et al. | |
| 7,398,826 B2 | 7/2008 | Hoefer et al. | |
| 7,426,961 B2 | 9/2008 | Stephenson et al. | |
| 7,482,310 B1 | 1/2009 | Reese et al. | |
| 7,497,263 B2 | 3/2009 | Parris et al. | |
| 7,506,689 B2 | 3/2009 | Surjaatmadja et al. | |
| 7,544,639 B2 | 6/2009 | Pursley et al. | |
| 7,544,640 B2 | 6/2009 | Luke et al. | |
| 7,581,594 B2 | 9/2009 | Tang | |
| 7,584,793 B2 | 9/2009 | Brown et al. | |
| 7,612,021 B2 | 11/2009 | Chatterji et al. | |
| 7,748,453 B2 | 7/2010 | Reddy | |
| 7,849,923 B2 | 12/2010 | Burukhin et al. | |
| 2004/0023816 A1 | 2/2004 | Burts, III | |
| 2006/0175060 A1 * | 8/2006 | Reddy | 166/294 |
| 2008/0115937 A1 * | 5/2008 | Reddy | 166/292 |
| 2008/0234146 A1 | 9/2008 | Barmatov et al. | |
| 2010/0087341 A1 | 4/2010 | Alary et al. | |
| 2010/0093922 A1 | 4/2010 | Johnson, Sr. | |
| 2010/0331451 A1 | 12/2010 | Johnson, Sr. | |

OTHER PUBLICATIONS

Challener, R.C. et al., "Evaluation of sand grain crushing in the sand dollar *Mellita tenuis* (Echinoidea: Echinodermata)", Aquatic Biology, Nov. 19, 2009, pp. 261-268, vol. 7, Publisher: Inter-Research.

Fontaine, J. et al., "Design, Execution, and Evaluation of a 'Typical' Marcellus Shale Slickwater Stimulation: A Case History" (Abstract Only), Paper No. 117772-MS, Oct. 11, 2008, Publisher: Society of Petroleum Engineers.

Kaufman et al., "Critical Evaluations of Additives Used in Shale Slickwater Fracs", SPE 119900, Nov. 16, 2008, Publisher: Society of Petroleum Engineers.

"International Search Report and Written Opinion for Co-Pending PCT/US2011/041707", Published by the European Patent Office Nov. 7, 2011.

Cha, J. N., et al., "Spontaneous Formation of Nanoparticle Vesicles from Homopolymer Polyelectrolytes" (Abstract Only), Journal of American Chemical Society, Jun. 13, 2003, pp. 8285-8289, vol. 125, No. 27, Publisher: American Chemical Society.

* cited by examiner

*Primary Examiner* — Randy Gulakowski
*Assistant Examiner* — Kara Boyle
(74) *Attorney, Agent, or Firm* — Fellers, Snider, Blankenship, Bailey & Tippens, P.C.

(57) ABSTRACT

An improvement over known hydraulic fracturing fluids. Boundary layer kinetic mixing material is added to components of fracturing fluid wherein kinetic mixing material is a plurality of particles wherein at least 25% of particles are several types, i.e., having surface characteristics of thin walls, three dimensional wedge-like sharp blades, points, jagged bladelike surfaces, thin blade surfaces, three-dimensional blade shapes that may have shapes similar to a "Y", "V" or "X" shape or other geometric shape, slightly curved thin walls having a shape similar to an egg shell shape, crushed hollow spheres, sharp bladelike features, 90° corners that are well defined, conglomerated protruding arms in various shapes, such as cylinders, rectangles, Y-shaped particles, X-shaped particles, octagons, pentagon, triangles, and diamonds. The resulting fluid exhibits improved dispersion of additives as well providing stabilization to a hydraulic fracture by reducing incidents of proppant grain column collapse and by reducing proppant flow back.

30 Claims, 35 Drawing Sheets

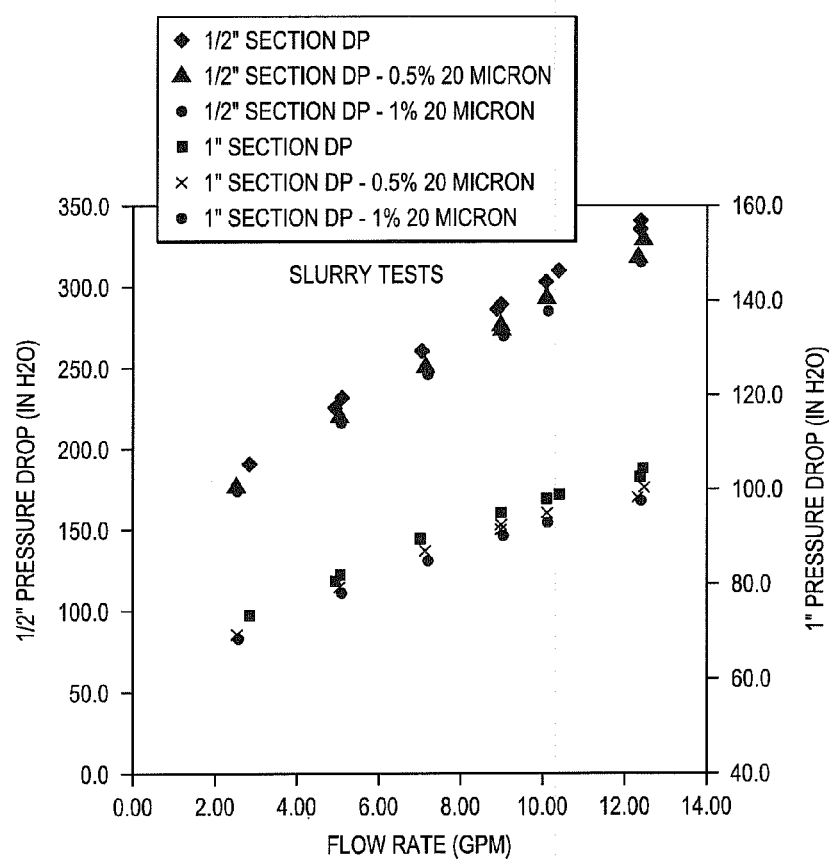

(2) APPENDIX 3; IMAGE 3 processed perlite (3) APPENDIX 3; IMAGE 5 processed perlite (4) Volcanic ash (tick mark = 100 micron)

(5) Volcanic ash (tick mark = 50 micron)

KINETIC PARTICLE TYPE II

The majority of hollow spheres materials can undergo a mechanical shaping in order to produce egg shell like fragments with surface characteristics to promote kinetic boundary layer mixing.

(1) APPENDIX 2; IMAGE 5 (Ash hollow spheres unprocessed)

(2) APPENDIX 1, IMAGE 7 (Ash 1 hollow spheres processed)

(3) 3M GLASS BUBBLE can be produced into broken eggshell like structures in order to produce surface characteristics to promote kinetic boundary layer mixing.

KINETIC PARTICLE TYPE III

Some solid materials have the ability to produce *conchordial* fracturing in order to produce surface characteristics to promote kinetic boundary layer mixing.

(1) APPENDIX 3; IMAGE 6 (Recycled glass 1)

(2) APPENDIX 3; Image 7 (Recycled glass 2)

(4) Images A,B and C are Sand particles that have the ability to fracture, which produces appropriate surface characteristics for kinetic boundary layer mixing particles.

*FIG. 25*

(6) Phosphocalcic hydroxyapatite, formula $Ca_{10}(PO_4)_6(OH)_2$, forms part of the crystallographic family of apatites, isomorphic compounds with the same hexagonal structure. This is the calcium phosphate compound most commonly used for biomaterial. Hydroxyapatite is mainly used in the medical sector.

(2)
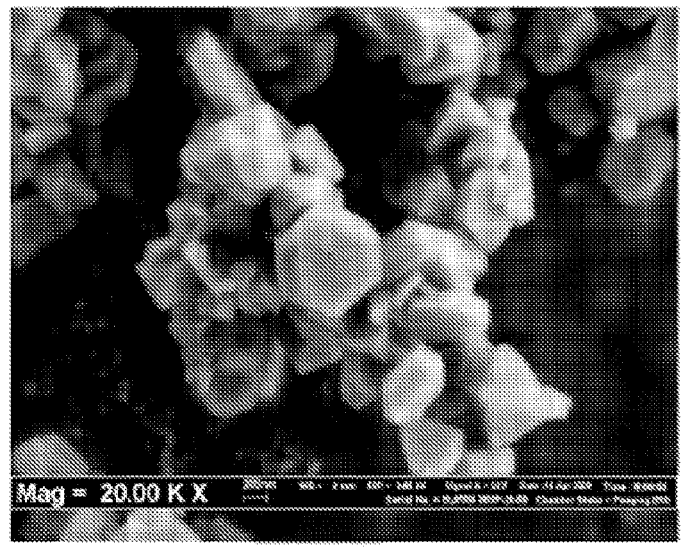
(a)
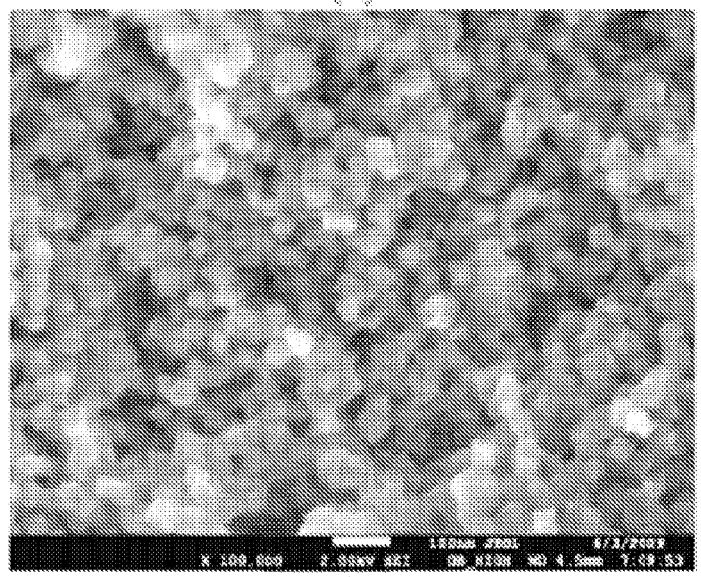
(b)
Figure 2. (a) SEM image of microcrystalline zeolite Y
(b) SEM image of nanocrystalline zeolite Y
*FIG. 29*

ZnO, 50~150 nm, Hydrophilic

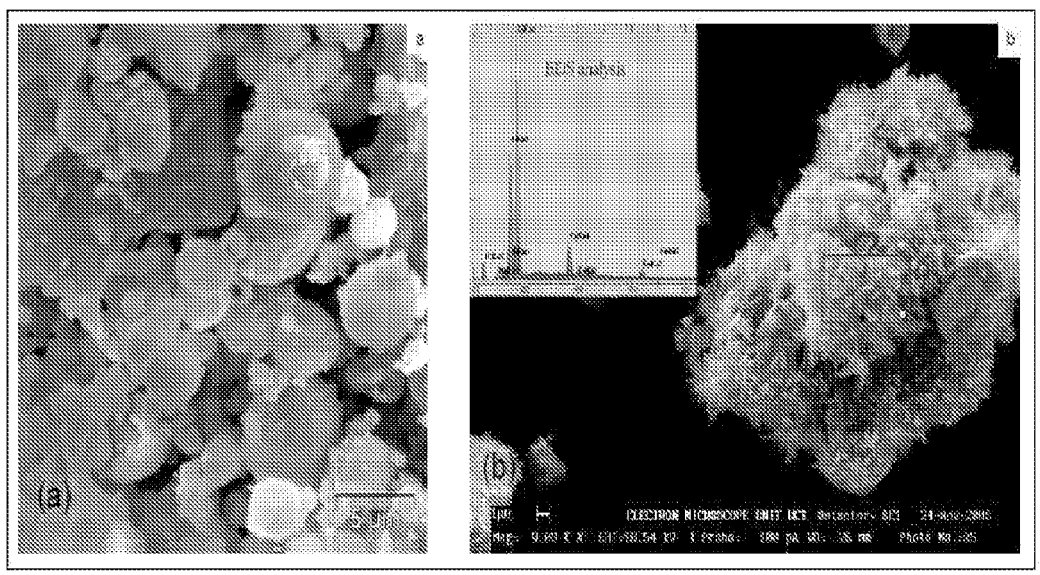
*FIG. 31A*  *FIG. 31B*

(2) The nanostructured CoOOH hollow spheres are versatile precursors for various cobalt oxide datives (eg. Co3O4 , LiCoO2), and also possess excellent catalytic activity.

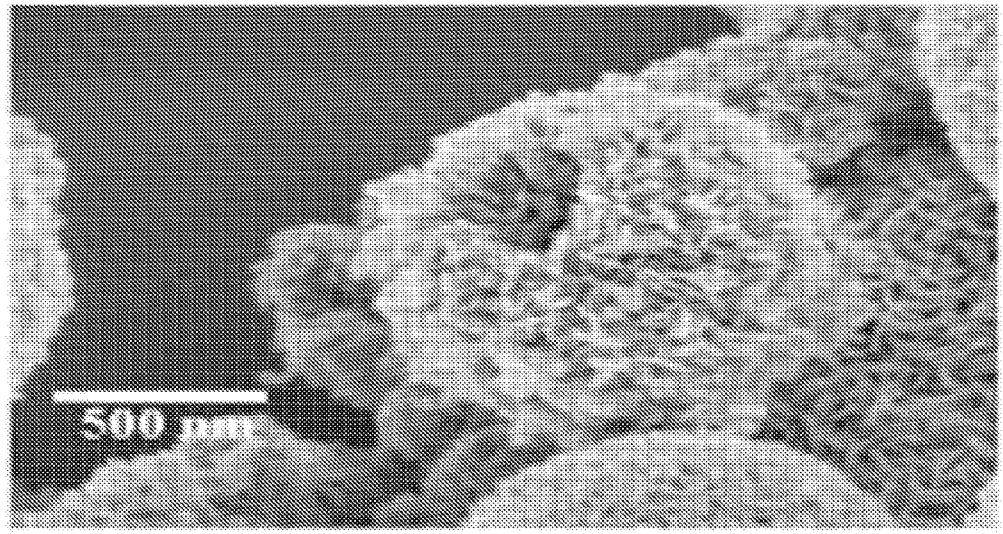

FIG. 32A (3) CuO is an important transition metal oxide with a narrow bandgap (Eg ) 1.2 eV). CuO has been used as a catalyst, a gas sensor, in anode materials for Li ion batteries. CuO has also been used to prepare high temperature superconductors and magnetoresistance materials

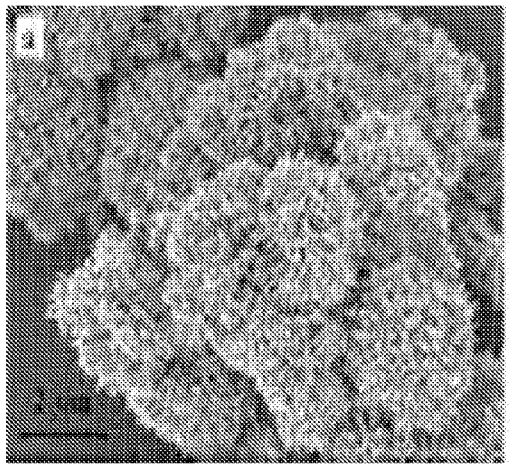 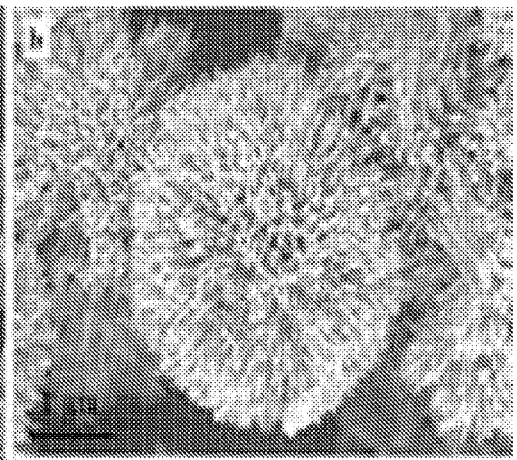

FIG. 32B                           FIG. 32C (5) 2.5 µm uniform plain Al$_2$O$_3$ nanospheres (6) 635 nm uniform plain Al$_2$O$_3$ nanospheres (have hair-like fibers on the surface)

(7) This computer generated model shows hair-like fibers which promote boundary layer adhesion so that nano sized particles will stay in contact with the boundary layer while Base Polypropylene with direct gas injection, no additive
Cell Size = 163 micron Polypropylene with 4.8% additive (27 micron expanded perlite)
Cell Size = 45 microns ial and manpower intensive surface handling procedures. Proppant flow-back also presents a problem of proppant disposal. In some cases, a well can be prematurely abandoned if costs to return the well to production are excessive. Proppant flow-back, although not desirable, can be tolerated in certain operational environments. However, proppant flow-back from a fracture during the production phase is problematic. In practice, 20% to 50% of the original proppant pumped into a formation may be produced back.

HYDRAULIC FRACTURING

CROSS REFERENCE TO RELATED APPLICATIONS

This application claims the priority of U.S. patent application Ser. No. 12/572,942, filed Oct. 2, 2009, titled, "STRUCTURALLY ENHANCED PLASTICS WITH FILLER REINFORCEMENTS", which claims priority to U.S. patent application Ser. No. 12/412,357, entitled "STRUCTURALLY ENHANCED PLASTICS WITH FILLER REINFORCEMENTS", filed Mar. 26, 2009, which claims the priority of U.S. Provisional Patent Application No. 61/070,876 entitled "STRUCTURALLY ENHANCED POLYMER WITH FILLER REINFORCEMENTS", filed Mar. 26, 2008. This application additionally claims priority to U.S. Provisional Patent Application No. 61/357,586, filed Jun. 23, 2010, titled "HYDRAULIC FRACTURING" the contents of each of which are hereby incorporated by reference.

FIELD OF THE INVENTION

The invention relates to improvements in fluids used in the oil and gas recovery process known as hydraulic fracturing. More particularly, the invention relates to an improvement of hydraulic fracturing performance down a well bore and into a fracture. More particularly, the invention provides stabilization to a hydraulic fracture by reducing incidents of collapse of proppant grain columns and by reducing proppant flow back.

BACKGROUND OF THE INVENTION

Much of the earth's remaining natural gas and oil is located in rock shale and rock formations at depths varying from 500-20,000 feet below the surface. Many of the naturally occurring formations suffer from low porosity and permeability, thereby restricting natural gas and/or oil to flow into a well bore where the gas and/or oil can be recovered.

Hydraulic fracturing is a process that creates fractures in low porosity, low permeability rocks of geological formations. A hydraulic fracture may be formed by pumping a fracturing fluid mixture into a well bore at a rate sufficient to increase pressure down-hole to a value in excess of the fracture gradient of the formation rock. The pressure causes the formation to crack or fracture, which allows the fracturing mixture to enter and extend the crack further into the formation.

To keep a fracture open after the pumping process stops, the fracturing fluid mixture contains a solid, called a proppant, that remains in the new fracture and keeps the fracture open. Various types of proppant may be used depending on the permeability or grain strength needed. A completed fracture provides a conductive path connecting a large area of the reservoir to the well, thereby increasing the area from which oil, natural gas and liquids can be recovered from the targeted formation.

Propped hydraulic fracture stimulation is widely used to improve well productivity from tight, otherwise noncommercial reservoirs. Other areas of application include sand control in weakly consolidated reservoirs, gas condensate fields, and high permeability reservoirs that show significant permeability anisotropy.

An important consideration in the practice of hydraulic fracturing is "proppant flow-back", i.e., the production of proppant back to the surface. Proppant flow-back can lead to damaged equipment and downtime, which necessitates costly An integral part of a hydraulic fracturing process is the introduction of proppant particles of various sizes into a fracture to hold the fractures open. Examples of proppants include structural materials such as sand, man-made ceramics, walnut shells and even polymer beads. Additionally, resin coated proppants have been used in an effort to reduce proppant flow-back. The resin coated proppant approach of gluing the sand together at the interface was an excellent starting point to reduce flow-back but mechanical cycling tends to crack the bonds that interconnect the proppant grains, thereby creating failure.

Studies have been undertaken to determine the mechanisms of flow-back. Laboratory work and theoretical simulations of several thousand individual proppant grains have shown that flow-back of plain proppant is critically dependent upon the ratio of mean grain diameter to fracture width. This dependence can be visualized as larger "columns" of proppants that have a greater tendency to buckle under loading. As a result of closure stress and inter-particle friction, a geometrically irregular arch of proppant grains is formed behind the fracture mouth. The buckled columns of proppant in front of the arch carry virtually no load. Therefore, small levels of proppant are initially transported to the well-bore even at low fluid flow rates. The loaded arch is stable until a sufficient fluid drag force is reached that is able to collapse the arch. A collapsing arch results in further proppant flow-back. An arch is a curved structure spanning an opening, serving to support a load by resolving the normal stress into lateral stress. For an arch to form, closure stress is required to generate a reaction force with the face of the fracture. The resolution of the forces in an arch necessarily sets up a pattern of shearing stresses within the material. At high closure stress these shear forces can become excessive and lead to pack failure.

Modes of proppant pack failure leading to proppant flow back are thought to be caused by arch destabilization due to excessive hydraulic and/or gravitational forces. Other modes of proppant pack failure are believed to include a fracture closure stress that is too low, proppant pack shear failure caused by too high fracture closure stress, as well as possible proppant crushing at high closure stress.

Critical parameters determining flow-back of plain proppants include fracture closure stress, both stabilizing and destabilizing. Other critical parameters include hydrodynamic force imposed from fluid production, which is destabilizing as the fluid flow tends to buckle proppant columns at the fracture mouth. Other critical parameters include the fracture width, which affects arch geometry and the transfer of friction and stress forces acting on proppants at a free face. Thus, for the same gradient, larger proppants will experience a greater destabilizing force. Similarly, at the fracture face the larger the proppant the fewer proppants per unit area are available to resist the applied closure stress and the larger the normal stress at the proppant contact.

A typical fracturing fluid mixture is made up of carrier fluid, additives and proppants. Typically, the carrier fluid and proppant comprise 99% of the mixture with less than 1% additives.

There are five types of carrier fluids normally used in the process. The five types are, 1) Water: which is typically ungelled freshwater or formations of brine; 2) Cross-linked water-based fluids, which are gelled with polymers that employ a cross-linking agent, such as a metallic ion to bond the polymer molecules together for increasing fluid viscosity; 3) Oil-based fluids, which include gelled oils, diesel or lease crude; 4) Oil-in-water emulsions, which are external phase gelled water, internal phase gelled diesel, lease crude or condensates; and 5) Foam, which is a mixture of gas, e.g., nitrogen or carbon dioxide, gelled liquid, such as water or oils, and foaming agents, where mixtures are typically 60% to 80% gas.

Examples of typical additives used in the hydraulic fracturing industry include: acids; alcohols; bases; biocides; buffers; breakers; clay stabilizers and kcl substitutes; cross-linkers such as aluminum, boron, titanium, or zirconium; cross-link accelerators and delay agents; demulsifiers; foamers and defoamers, friction reducers; iron control agents; cellulose and guar polymers including standard, hpg, cmg, cmhpg; polymer slurries, including diesel and "green"; oxygen scavengers; salts; surfactants; and flurosurfactants. This list of additives is only a representative portion of all additives used and is not meant to be a complete list.

Effectively dispersing a well-formulated fracturing fluid with a complex set of additives into a homogeneous emulsion is extremely difficult to accomplish due, primarily, because of chemical affinity mismatches that result from the broad diversity of the additives used. Additionally, because of the toxic nature of some of the chemicals used in hydraulic fracturing, industry is facing stiff and growing environmental regulation. Regulation is anticipated that will establish limits for various materials contained in hydraulic fracturing additives and carrier fluids.

Due to environmental issues associated with hydraulic fracturing, the oil and gas industry has shifted towards using water with mineral additives as the fracturing fluid of choice. The most commonly used additive in water hydraulic fracturing is a friction reducer.

Carrier fluids, additives and proppant must be mixed for use in hydraulic fracturing.

There are three types of commonly used mixing principles:

1. Static mixing, wherein liquids flow around fixed objects, either via force produced flow by pressure through mechanical means or gravity induced flow;

2. Dynamic mixing, wherein liquid induced mixing results from mechanical agitation via impellers, wiping blade and high shear turbines as well as single or double screw extruder designs or screw agitation designs; and 3. Kinetic mixing, wherein liquid is mixed by velocity impacts on a surface or wherein two or more liquids form a velocity impact by impinging on one another.

All three of the above mixing methods have one thing in common that hinders the optimizing of mixing regardless of the fluid being combined and regardless of whether the materials being mixed are polar, nonpolar, organic or inorganic etc. or if it is a filled material with compressible or noncompressible fillers.

The commonality that hinders optimizing of mixing is that all incompressible fluids have a wall effect or a boundary layer effect where the fluid velocity is greatly reduced at the wall or mechanical interface. Static mixing systems use this boundary layer to fold or blend the liquid using this resistive force to promote agitation.

Dynamic mixing, regardless of the geometry of mixing blades or turbine, results in dead zones and incomplete mixing because of the boundary layer. Dynamic mixing uses high shear and a screw blade designed to use the boundary layer to promote friction and compression by centrifugal forces to accomplish agitation while maintaining an incomplete mixed boundary layer on mechanical surfaces.

Kinetic mixing suffers from boundary layer effects on velocity profiles both on the incoming streams and at the injector tip. However, kinetic mixing suffers minimal boundary layer effects except for transport fluid phenomena.

A further explanation of the boundary layer of the flowing fluids follows. Aerodynamic forces depend in a complex way on the viscosity of a fluid. As a fluid moves past an object, the molecules in close proximity to the surface tend to stick to the surface. The molecules just above the surface are slowed down by their collisions with the molecules that are sticking to the surface. These molecules, in turn, slow down the flow just above them. The farther away from the surface, the fewer the collisions that are affected by the object surface. Therefore, a thin layer of fluid is created near the surface in which the velocity of the fluid changes from zero at the surface to the free stream value away from the surface. Engineers call this layer the "boundary layer" because the layer occurs on the boundary of the fluid.

As discussed above, as an object moves through a fluid, or as a fluid moves past an object, molecules of the fluid near the object are disturbed and as the molecules move around the object. Aerodynamic forces are generated between the fluid and the object. The magnitude of the aerodynamic forces depends on the shape of the object, the speed of the object, the mass of the fluid going by the object and on two other important properties of the fluid, i.e., the viscosity, or stickiness, and the compressibility, or springiness, of the fluid. To properly model these effects, aerospace engineers use similarity parameters, which are ratios of these effects to other forces present in the problem. If two experiments have the same values for the similarity parameters, then the relative importance of the forces are being correctly modeled.

Referring now to FIG. 1, a two dimensional representation of the streamwise velocity variation from free stream to the surface is shown. In reality, the effects are three dimensional. From the conservation of mass in three dimensions, a change in velocity in the streamwise direction causes a change in velocity in the other directions as well. A small component of velocity perpendicular to the surface displaces or moves the flow above it. The thickness of the boundary layer can be defined as the amount of this displacement. The displacement thickness depends on the Reynolds number, which is the ratio of inertial (resistant to change or motion) forces to viscous (heavy and gluey) forces and is given by the equation: Reynolds number (Re) equals velocity (V) times density (r) times a characteristic length (l) divided by the viscosity coefficient (mµ), i.e., $Re = V*r*l/m\mu$.

Still referring to FIG. 1, boundary layers may be either laminar (layered), or turbulent (disordered) depending on the value of the Reynolds number. For lower Reynolds numbers, the boundary layer is laminar and the streamwise velocity changes uniformly as a function of distance away from the wall, as may be seen on the left side of FIG. 1. For higher Reynolds numbers, the boundary layer is turbulent and the streamwise velocity is characterized by unsteady, or changing with time, swirling flows inside the boundary layer. The external flow reacts to the edge of the boundary layer just as it would to the physical surface of an object. Therefore, the boundary layer gives any object an effective shape, which is usually slightly different from the physical shape. The boundary layer may lift off or "separate" from the body and create an effective shape that is substantially different from the physical shape. Separation occurs because the flow in the boundary has very low energy relative to the free stream and is, therefore, more easily driven by changes in pressure. Flow separation is the reason for airplane wing stall at high angle of attack.

Boundary-layer Flow

The portion of a fluid flow that occurs near a solid surface is where shear stresses are significant and is where inviscid-flow assumptions may not be used. Solid surfaces interact with a viscous fluid flow because of the no-slip condition discussed above, i.e., because of the physical requirement that fluid and solid have equal velocities at their interface. Therefore, fluid flow is retarded by a fixed solid surface, which results in the formation of a finite, slow-moving boundary layer. For the boundary layer to be thin, the Reynolds number of the body must be large, i.e., $10^3$ or greater. Under these conditions the flow outside the boundary layer is essentially inviscid and plays the role of being a driving mechanism for the layer.

Referring now to FIG. 2, a typical low-speed or laminar boundary layer is shown. Such a display of the streamwise flow vector variation near a wall is called a velocity profile. The no-slip condition requires that $u(x,0)=0$, as shown, where u is the velocity of flow in the boundary layer. Velocity rises monotonically with distance y from the wall, finally merging smoothly with the outer (inviscid) stream velocity $U(x)$. Assuming a Newtonian fluid, at any point in the boundary layer the fluid shear stress $\tau$ is proportional to the local velocity gradient. The value of the shear stress at the wall is most important, since the shear stress value relates not only to the drag of the body but often also to its heat transfer. At the edge of the boundary layer $\tau$ approaches zero asymptotically. There is no exact spot where $\tau=0$, therefore the thickness $\delta$ of a boundary layer is usually defined arbitrarily as the point where $u=0.99\ U$.

Friction Reducers

As stated above, additives in hydraulic fracturing fluid are typically deployed for use as friction reducers. As shown in FIG. 3, experiments were conducted wherein various friction reducers were added at a concentration of 0.25 gpt in 2% (wt) Kcl tap water flowing through a ½" OD/0.402" ID pipe. FIG. 4 shows experimental results comparing of 1.0 gpt of cationic friction reducers in several different fluids through a ½" OD/0.402" ID pipe. The graphs are discussed in SPE 119900, "Critical Evaluations of Additives Used in Shale Slickwater Fracs"; (P. Kaufman and G. S. Penny, CESI Chemical a Flotek Co. and J. Paktinat, Universal Well Services Inc.)

Each of FIGS. 3 and 4 show that there are two clear regions where the dispersion of a typical material is greatly influenced, i.e., at 0 to 10 seconds and again at 20 to 30 seconds. During the experiments, the fluid was recycled back into the loop through the circulation pump every 10 seconds. The circulation pump acted like a mixing system, thereby improving the material performance of the additive. The experimental results, represented by the curves of FIGS. 3 and 4, illustrate that dispersion of additives is crucial to the performance of the material. The periods of time from 0 to 10 second and from 20 to 30 seconds correlate to the times when typical friction reduction material passes through the mixing system in the cyclic loop process. The shape of the curves of FIGS. 3 and 4 indicate that, at about 10 seconds, the typical material has not been adequately dispersed and, therefore, is not distributed into the boundary layer of the flowing material. Therefore, the important disbursement of additives is desirable.

SUMMARY OF THE INVENTION

The technology of the invention provides a unique solution to the above mentioned problems. The technology of the invention provides kinetic mixing of the boundary layer, which allows for reduction or replacement of additives that may be environmentally damaging while still maintaining benefits associated with the additives. The technology of the invention uses environmentally safe, chemically stable solid particles to continuously mix materials as long as the fluid is flowing.

The invention relates to improvements in boundary layer mixing, i.e., the invention relates to the effects of structural mechanical fillers on fluid flow, wherein the particles have sizes ranging from nano to micron. The invention uses the principles of boundary layer static film coupled with frictional forces associated with a particle being forced to rotate or tumble in the boundary layer due to fluid velocity differentials. As a result, kinetic mixing is promoted through the use of the structural fillers.

As an example, consider that a hard sphere rolling on a soft material travels in a moving depression. The soft material is compressed in front of the rolling sphere and the soft material rebounds at the rear of the rolling sphere. If the material is perfectly elastic, energy stored during compression is returned to the sphere by the rebound of the soft material at the rear of the rolling sphere. In practice, actual materials are not perfectly elastic. Therefore, energy dissipation occurs, which results in kinetic energy, i.e., rolling. By definition, a fluid is a material continuum that is unable to withstand a static shear stress. Unlike an elastic solid, which responds to a shear stress with a recoverable deformation, a fluid responds with irrecoverable flow. The irrecoverable flow may be used as a driving force for kinetic mechanical mixing in the boundary layer. By using the principle of rolling, kinetic friction and an increase of fluid sticking at the surface of the no-slip zone, adherents are produced. Fluid flow that is adjacent to the boundary layer produces an inertial force upon the adhered particles. Inertial force rotates the particles along the surface of mechanical process equipment regardless of mixing mechanics used, i.e., regardless of static, dynamic or kinetic mixing.

Geometric design or selection of structural filler particles is based on the fundamental principle of surface interaction with the sticky film in the boundary layer where the velocity is zero. Mechanical surface adherence is increased by increasing particle surface roughness. Particle penetration deep into the boundary layer produces kinetic mixing. Particle penetration is increased by increasing sharpness of particle edges or bladelike particle surfaces. A particle having a rough and/or sharp particle surface exhibits increased adhesion to the non-slip zone, which promotes better surface adhesion than a smooth particle having little to no surface characteristics. The ideal filler particle size will differ depending upon the fluid due to the viscosity of a particular fluid. Because viscosity differs depending on the fluid, process parameters such as temperature and pressure as well as mixing mechanics produced by sheer forces and surface polishing on mechanical surfaces will also differ, which creates a variation in boundary layer thickness. A rough and/or sharp particle surface allows a particle to function as a rolling kinetic mixing blade in the boundary layer. A hardened particle having rough and/or sharp edges that rolls along a fluid boundary layer will produce micro mixing by agitating the surface area of the boundary layer exists.

Solid particles used for kinetic mixing in a boundary layer preferably have following characteristics:

Particles should have a physical geometry characteristic that allows the particle to roll or tumble along a boundary layer surface.

Particles shall have a surface roughness sufficient to interact with a zero velocity zone or a non-slip fluid surface to promote kinetic friction rather than static friction. The mixing efficiency of particles increases with surface roughness.

Particles should be sufficiently hard so that the fluid is deformed around a particle for promoting kinetic mixing through the tumbling or rolling effect of the particle.

Particles should be size proportional to the boundary layer of fluid being used so that the particles roll or tumble due to kinetic rolling friction.

Particles should not be too small. If the particles are too small, the particles will be caught in the boundary layer and will lose the ability to tumble or roll, which increases friction and promotes mechanical wear throughout the contact zone of the boundary.

Particles should not be too large. If the particles are too large, the particles will be swept into the bulk fluid flow and have a minimal, if any, effect on kinetic boundary layer mixing. The particles should have size and surface characteristics, such as roughness and/or sharp bladelike characteristics, to be able to reconnect in the boundary layer from the bulk fluid during the mixing process.

Particles can be solid or porous materials, manmade or naturally occurring minerals and or rocks.

Physical Geometry of Particles:

Particle shapes can be spherical, triangular, diamond, square or etc., but semi-flat or flat particles are less desirable because they do not tumble well. Semi-flat or flat particles tumble less well because the cross-sectional surface area of a flat particle has little resistance to fluid friction applied to its small thickness. However, since agitation in the form of mixing is desired, awkward forms of tumbling are beneficial since the awkward tumbling creates dynamic random generated mixing zones at the boundary layer. Random mixing zones are analogous to mixing zones created by big mixing blades operating with little mixing blades. Some of the blades turn fast and some of the blades turn slow, but the result is that the blades are all mixing. In a more viscous fluid, which has less inelastic properties, kinetic mixing by particles will produce a chopping and grinding effect due to particle surface roughness and due to sharp edges of the particles.

Spherical particles having extremely smooth surfaces are not ideal for the following reasons. First, surface roughness increases friction between the particle and the fluid, which increases the ability of the particle to remain in contact with the sticky and/or the non-slip zone. In contrast, a smooth surface, such as may be found on a sphere, limits contact with the sticky layer due to poor surface adhesion. Second, surface roughness directly affects the ability of a particle to induce mixing through tumbling and/or rolling, whereas a smooth surface does not. Thirdly, spherical shapes with smooth surfaces tend to roll along the boundary layer, which can promote a lubricating effect. However, spherical particles having surface roughness help to promote dynamic mixing of the boundary layer as well as promote lubricating effects, especially with low viscosity fluids and gases.

Advantages of this technology include:

Cost savings achieved by the replacement of expensive polymers with inexpensive structural material.

Cost savings achieved by increasing an ability to incorporate more organic material into a fluid.

Cost savings achieved by increasing productivity with high levels of organic and/or structural materials.

Better disbursement of additives and/or fillers through increased mixing on large mechanical surfaces produced by boundary mixing.

Better mixing of polymers by grinding and cutting effects of the particles rolling along the large surface area as the velocity and compression of the polymers impact the surface during normal mixing operations.

Reduction of coefficient of friction on mechanical surfaces caused by boundary layer effects with drag which is replaced by rolling kinetic friction of a hard particle in the boundary layers.

Increased production by reduction of the coefficient of friction in the boundary layer where the coefficient of friction directly affects the production output.

Surface quality improvement, with or without fillers, due to polish effects caused by kinetic mixing in the boundary layer on all mechanical surfaces including dyes, molds and etc. that the materials flow in and around during the finishing process.

Promotion of boundary layer removal by kinetic mixing, thereby having the property of self-cleaning of the boundary layer.

Enhanced heat transfer due to kinetic mixing in the boundary layer, which is considered to be a stagnant film where the heat transfer is dominantly conduction but the mixing of the stagnant film produces forced convection at the heat transfer surface.

The kinetic mixing material will help meet current and anticipated environmental regulatory requirements by reducing the use of certain toxic additives and replacing the toxic additives with an environmentally friendly, inert solid, i.e., kinetic mixing material, that is both chemically and thermally stable.

BRIEF DESCRIPTION OF THE DRAWINGS

FIG. 7 shows results of a slurry test.

FIG. 25A is an SEM image of a sand particle that has the ability to fracture, which produces appropriate surface characteristics for kinetic boundary layer mixing particles.

FIG. 25B is an SEM image of a sand particle that has the ability to fracture, which produces appropriate surface characteristics for kinetic boundary layer mixing particles.

FIG. 25C is an SEM image of a sand particle that has the ability to fracture, which produces appropriate surface characteristics for kinetic boundary layer mixing particles.

FIG. 25D is an SEM image of a sand particle that has the ability to fracture, which produces appropriate surface characteristics for kinetic boundary layer mixing particles.

FIG. 29A is an SEM image of microcrystalline zeolite Y at 20 k× magnification.

FIG. 29B is an SEM image of microcrystalline zeolite Y at 100 k× magnification.

FIG. 31A is an SEM image of solid residues of semispherical clustering material.

FIG. 31B is an SEM image of zeolite-P synthesized at 100° C.

FIG. 32A is an SEM image of nanostructured CoOOH hollow spheres.

FIG. 32B is an SEM image of CuO.

FIG. 32C is an SEM image of CuO.

FIG. 35 is a computer-generated model showing hair-like fibers of CoOOH

DETAILED DESCRIPTION OF THE PREFERRED EMBODIMENTS

Figure 1:
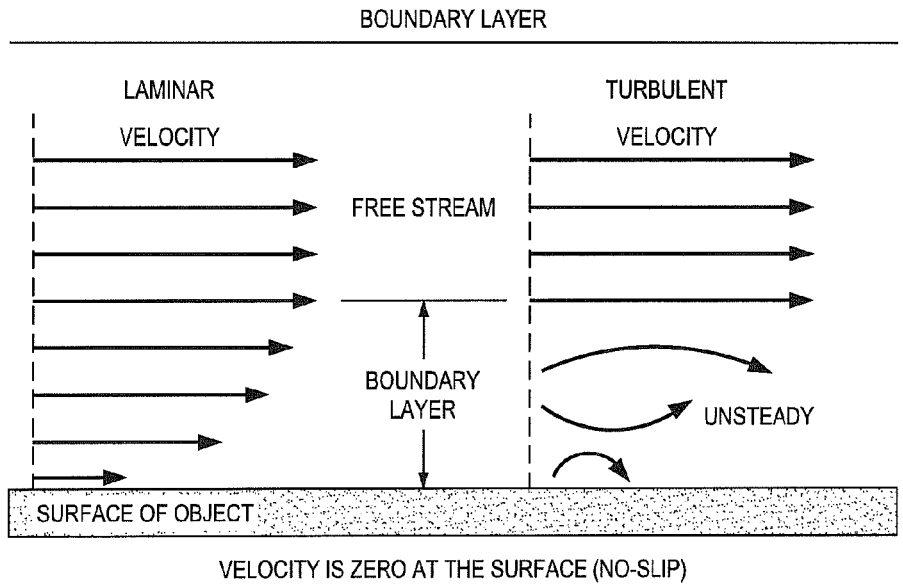
FIG. 1 is a graphical explanation of boundary layer concepts.
Figure 2:
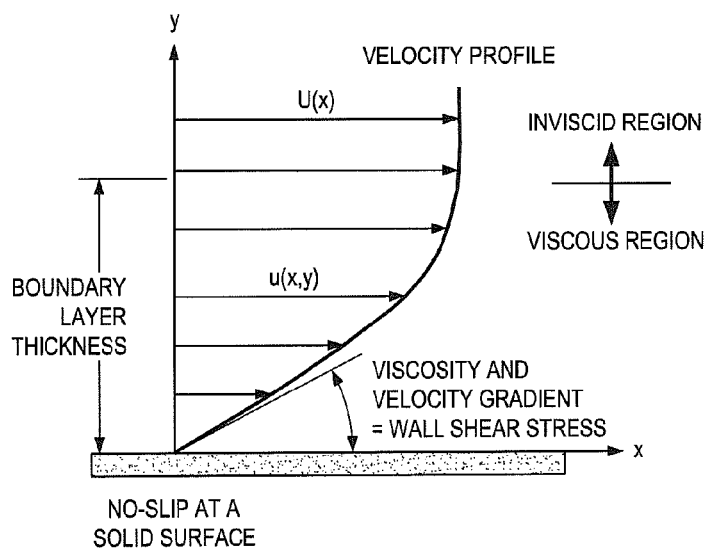
FIG. 2 is a graphical explanation of a low speed or laminar boundary layer.
Figure 3:
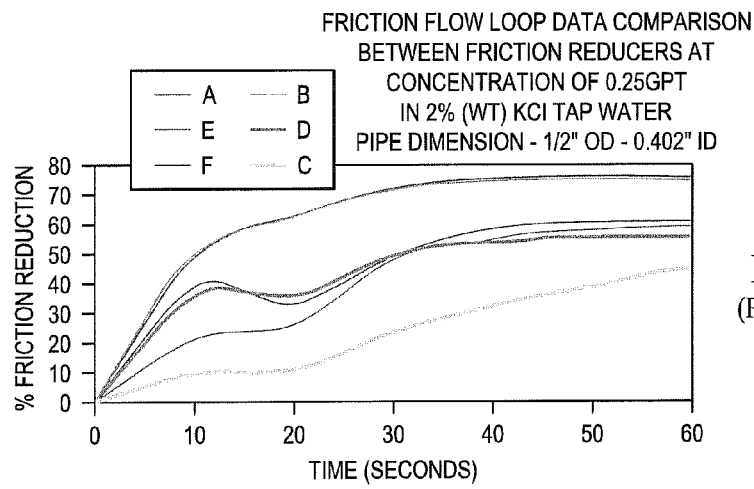
FIG. 3 is a graph showing data from a friction flow loop test comparing friction reducers.
Figure 4:
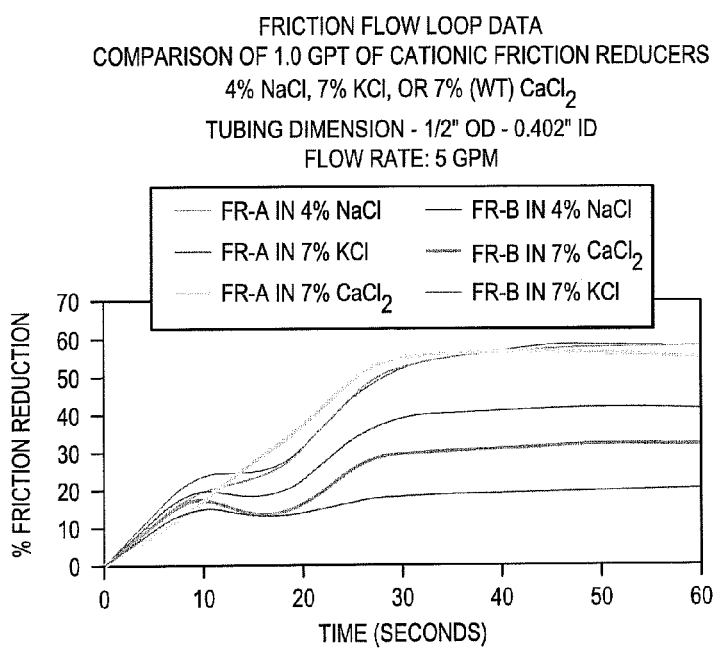
FIG. 4 is a graph showing data from a friction flow loop test comparing friction reducers.
Figure 5:
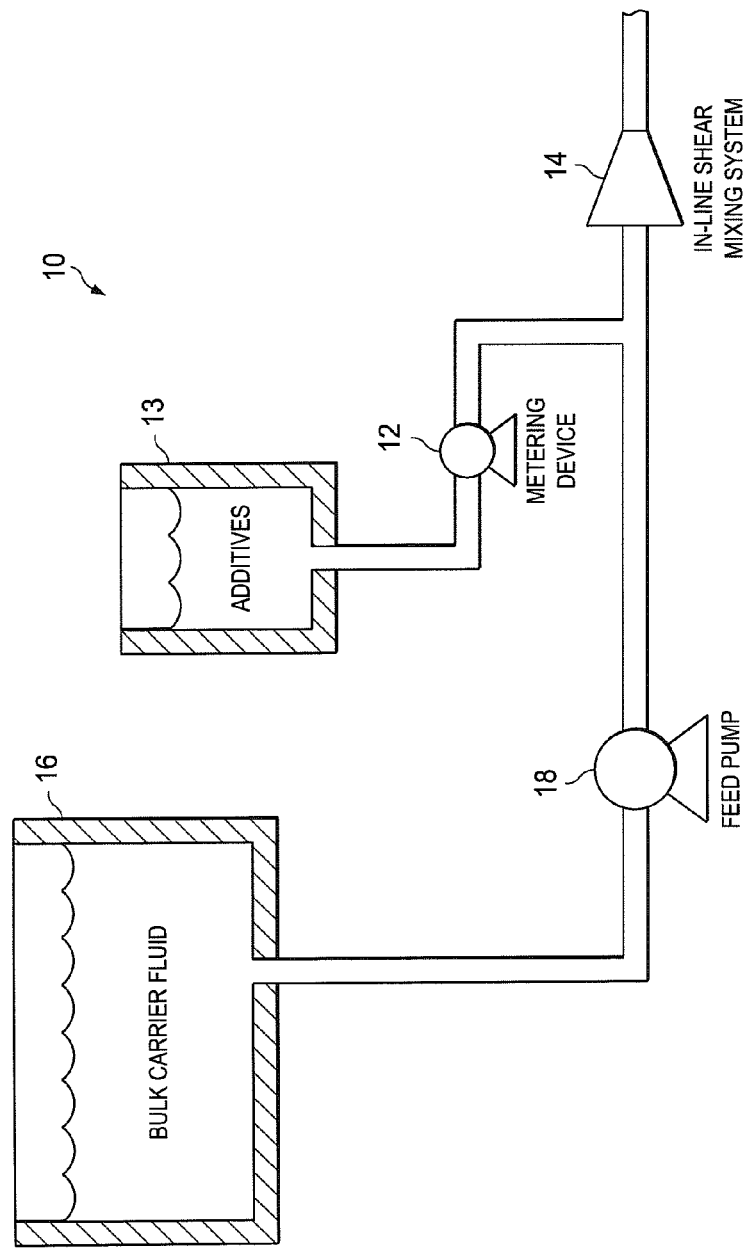
FIG. 5 is a schematic diagram of an in-line shear mixing system for adding sharp edged particles to a hydraulic fracturing fluid.
Figure 6:
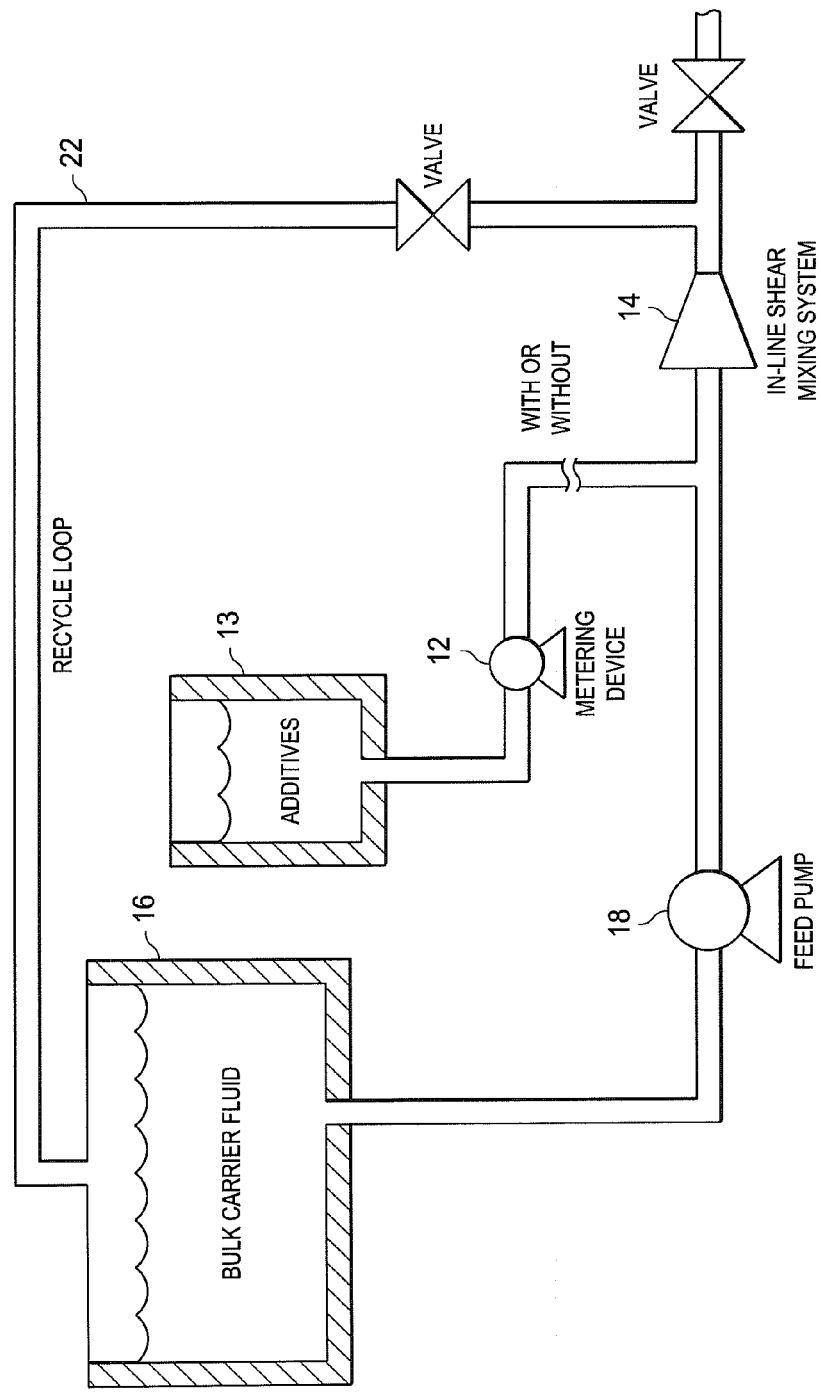
FIG. 6 is a schematic diagram of an in-line shear mixing system having a recycle loop wherein the system is for adding sharp edged particles to a hydraulic fracturing fluid.
Figure 8A:
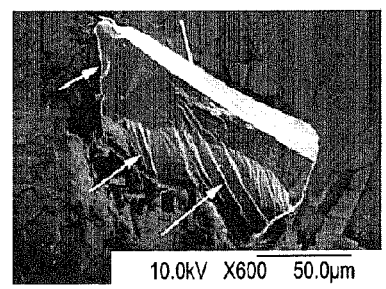
FIG. 8 shows electron microscope images of crushed sand.
Figure 8B:
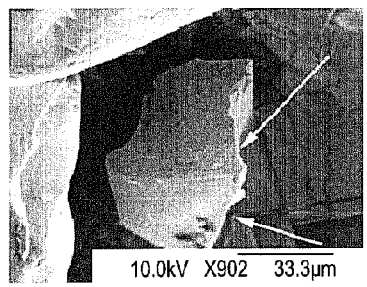
Figure 8C:
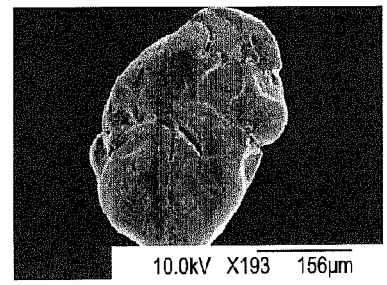
Figure 8D:
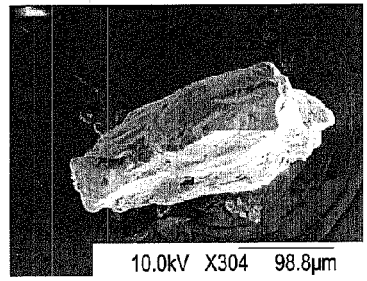

The fracturing fluid of the invention is an improvement over known hydraulic fracturing fluids in three areas. The first aspect of the invention relates to the addition of a boundary layer kinetic mixing material having micro/nano sized particles. A kinetic mixing material is a plurality of particles wherein at least 25% of the particles are of several types, described below, having surface characteristics of one of thin walls, three dimensional wedge-like sharp blades, points, jagged bladelike surfaces, thin blade surfaces, three-dimensional blade shapes that may have shapes similar to a "Y", "V" or "X" shape or other geometric shape, slightly curved thin walls having a shape similar to an egg shell shape, crushed hollow spheres, sharp bladelike features, protruding 90° corners that are sharp and well defined, conglomerated protruding arms in various shapes, such as cylinders, rectangles, Y-shaped particles, X-shaped particles, octagons, pentagon, triangles, and diamonds. The mixing mechanism that is required to establish kinetic mixing with particles is that fluid must be moving. When fluid flow stops, kinetic mixing stops. For example, mechanical mixing systems are applied at the surface to produce hydraulic fracturing fluids but the mixing stops once fluid leaves the agitation zone. However, this is not the case with kinetic mixing particles. Kinetic mixing particles continue to mix the fracture fluid all the way through the flow process through the agitation process, down the wellbore, into the hydraulic fractures until the fluid stops moving. The kinetic mixing material is mixed with an additive formulation prior to blending the additive formulation into a carrier fluid and before injecting the mixture into a well. The kinetic mixing material may be added by the manufacturer of an additive formulation. The second aspect of the invention involves introducing the additive formulation into a carrier fluid by mechanical shear. The third aspect of the invention involves using kinetic boundary layer mixing particles to promote mechanical interlocks between proppant grains, which stabilizes a hydraulic fracture.

1. Adding a Micro/Nano Sized Kinetic Mixing Material into an Additive Formulation Prior to Blending the Mixing Material into a Carrier Fluid and before Injecting the Mixing Material into the Well.

A kinetic mixing material made of micro/nano sized particles may be introduced into an additive formulation. An example mixing material is described in US Patent Publication Number 2010/0093922 for "Structurally Enhanced Plastics with Filler Reinforcements" which is hereby incorporated by reference. The resulting improved mixing will produce a significantly more homogeneous emulsion as compared to an additive and carrier fluid mixture not having a kinetic mixing material. Additionally, an emulsion containing the kinetic mixing material will exhibit self-dispersing properties when introduced into a carrier fluid.

As an example, an emulsion may be formulated that includes one gallon polymer per thousand gallons of liquid wherein the kinetic mixing material can start at a formula weight of as low as 0.05% and can be increased up to 70% formula weight until desired performance is reached. The polymer may be a cross-linked water based fluid, an oil based fluid, an oil-in-water emulsion, a foam, or other suitable substance. Other quantities and ratios are additionally contemplated as being effective. The above example is for illustration purposes only and should not be construed as limiting.

Forming an emulsion by introducing a kinetic mixing material into an additive formulation prior to mixing with a carrier fluid can be accomplished in various ways, including by using one of the following three mixing systems: turbine blade or impeller system; shear system; or impingement system. The shear and impingement mixing systems can be used to adjust the micro/nano sized kinetic mixing material into a particle of the desired size during the mixing process. The shear mixing system homogenizes the additives and may adjust the physical particle size of the micro/nano kinetic mixing material, depending on the type of material being used. Example materials include expanded perlite, fly ash and zeolite. Because of the porous geometry and thin cell walls, these materials are ideal candidates. In contrast, materials such as sand, granite, and other hard structural solids are less ideal since these materials will tend to damage mechanical shear blades.

Kinetic mixing particles can be made from a wide variety of materials with varying densities and surface characteristics as illustrated by the SEM photograph in the figures. The variety allows someone skilled in art the ability to select materials or a mixture of materials that will stay suspended in the operating fluid to achieve the desired performance.

Particle sizes may be adjusted up and down to produce steady suspension in fluid materials.

2. Introducing the Additive Mixture into the Carrier Fluid by Mechanical Shear.

A high-shear, in-line mixing system may be used to incorporate the additive mixture into a carrier fluid prior to well injection. The incorporation of the additive mixture prior to injection can be accomplished by two methods:

First, the disbursement of additives can be improved by use of an in-line shear mixing system 10 (FIG. 5) with metering device 12. Metering device 12 precisely measures amounts of additives needed in formulation 13. Examples of additives include well treatment polymers. The additives are measured prior to shear mixing into bulk carrier fluid 16. The in-line shear mixing process equipment 14 is placed between a carrier fluid storage tank 16 and a well injection pumping system. Carrier fluid 16 with additive formulation 13, such as dispersed polymer, will then be fed by feed pump 18 to the well injection pump where proppant 24 will be added prior to well injection.

Second, an in-line shear mixing system 22 (FIG. 6) may be utilized with or without metering device 12 for measuring amounts of additive formulation 13. In this embodiment, in-line shear mixing process equipment 14 is fed by feed pump 18 from the carrier fluid storage tank 16 and the discharge from the in-line shear mixing process equipment 14 is connected to recycle loop 22 that feeds back into carrier fluid storage tank 16. This recycle process is continued until appropriate dispersion is achieved. Carrier fluid 16 with additive formulation 13, such as dispersed polymer, is then fed to a well injection pump where proppant 24 will be added prior to well injection.

A concentration of powdered Kelzan® XCD polymer (available from Kelco Oil Field Group, 10920 W. Sam Houston Parkway North, Suite 800, Houston, Tex. 77064) was flow tested. A (type I) boundary layer kinetic mixing particle made from processed expanded perlite was used. The particles had a mean particle size of 20 micron. The particles were added to the thoroughly mixed XCD polymer mixture at two different concentrations. The first concentration was at 5% by weight added directly into the circulating fluid. The second concentration was 1%, which was accomplished by adding an additional 5% by weight to the circulating fluid. The reason the Type I kinetic mixing particle was chosen is because the large bladelike characteristic of the Type I particles produce maximum mixing and/or dispersion with minimal fluid flow to produce tumbling of particles. Perlite was chosen due to its glass characteristics that possess no surface charges, thereby avoiding conglomeration of particles, which allows for rapid disbursing of the particles with minimal mixing.

A Marsh viscosity of 90 seconds was targeted. The mix ratio was 1 lb of the polymer per 10 gallons of water. After an initial mixing, the combined materials were pumped from the storage tank, through the circulation loop, and back to a storage tank where a turbine mixing system continuously agitated and circulated the tank in a configuration similar to that shown in FIG. 6. The mixing process continued for two hours to minimize or eliminate the possibility that the polymer was not thoroughly mixed to ensure fluids stabilization prior to taking baseline testing. Then the boundary layer kinetic mixing particles were added to the mixture.

The resulting thoroughly mixed XCD and water solution had a plastic viscosity of 12 cP and an apparent viscosity of 33.5 cP.

Laboratory testing has shown that the lower the viscosity of a fluid, the thinner the boundary layer. An oversized kinetic particle type (I) was chosen, i.e., a Type I particle approximately 20μ in diameter, to show that large particles used for mechanical propannt interlocking have the ability to still have a positive effect on the mixing properties of a polymer. A appropriately sized kinetic mixing particle for a 33.5 cP fluid should be below 300 nm as a minimum. The 20μ kinetic particle is too large for the adhesive effects of the viscosity at the wall of the boundary layer to hold onto the particle. The fluid forces flowing at the boundary layer cause the particle to continuously bump against the boundary layer and then be swept back out into the bulk fluid flow. A type (I) kinetic particle will still produce polymer kinetic mixing as it tumbles through the bulk fluid with minimal interaction with the boundary layer.

Tests were conducted with the same fluid at 0.5% and 1% concentration of the 20-micron kinetic mixing particle of the invention. The results can be seen in the graph of FIG. 7, which shows a lower pressure drop of the flowing fluid when the particles were added. FIG. 7 shows that there is a consistent linear improvement to the flow rate which is contributed to better mixing of the polymer solution by the addition of a kinetic boundary layer mixing particle. This data also illustrates that oversized kinetic boundary layer mixing particles can be incorporated into hydraulic fracturing fluids with no adverse effects. Therefore, these oversized kinetic particles will provide a beneficial mechanical interlocking for proppants.

3. Tailoring Kinetic Mixing Material to Promote Mechanical Interlocking between Proppant Grains.

Proppant 24 may be modified in such a way as to impart upon it the characteristics necessary to become a kinetic mixing material 20. For example, sand may be roller milled to produce edge effects like those discussed in U.S. Patent Application Publication No. 2010/0093922, discussed above. Alternatively, the sand may be crushed. One example of a machine that allows for production of grains of a desired size is the V7 dry sand making system, available from Kemco, a private Japanese corporation based in Hiroshima, Japan. For example, as shown in FIG. 8, scanning electron images of artificially crushed quartz sand grains show freshly broken surfaces in panes A, B, and D of the type that may be described as a sharp blade-like surface. In particular, the broken surfaces project edges defined by planes meeting at an angle of 90° or less. Pane C shows rounded surfaces not ideal for acting as a kinetic mixing material. In a preferred embodiment, 0.5% to 100% of proppant 24 can be comprised of crushed sand. Preferably, the crushed sand has a mesh size of nano sized to approximately 20 mesh. By modifying the proppant 24 to have characteristics of a kinetic mixing material 20, the proppant 24 itself reduces the coefficient of friction caused by boundary layer interaction of the fracturing fluid flow and reduces the increased load factor of proppant 24 presence in the well injection fluid. It is possible to replace most if not all friction reduction polymers, i.e., additives 13, by adding a modified proppant 24.

The areas of hydraulic fracturing fluid improvement discussed above improve flow back reduction and proppant penetration into a hydraulically fractured formation, through improved bonding between proppant grains 24; improved stability of larger fractures comprised of an opening that is greater than five diameters wide of proppant grain 24; improved shear stress bearing stability of proppant 24; improved stabilization of columns of proppant 24; improved crush strength of proppant 24; improved proppant 24 penetration into fractured formation; and improved production through flow dynamics stabilization of proppant 24. As fracture fluid is pumped into a well fracture, fracture fluid flow slows down and proppant grains 24 fall out. The kinetic mixing material 20 settles out with proppant 24 and locates on and between the proppant grains 24 to jam in between the proppant grains 24 to prevent relative movement of the proppant grains 24. If kinetic mixing particles 20 are selected from particle Type I, then porous materials or hollow spheres may be crushed by the proppant 24, which results in good interspersing of the kinetic mixing particles as in self-shaping interlocking between the proppant 20, as shown in FIG. 9.

The above listed benefits accrue from an increased ability to stack proppant grains 24 to support an opened fracture. The stacking of round objects on top of each other to produce a large load-bearing structure supported by all of the round objects under the load is a difficult endeavor.

Figure 9:
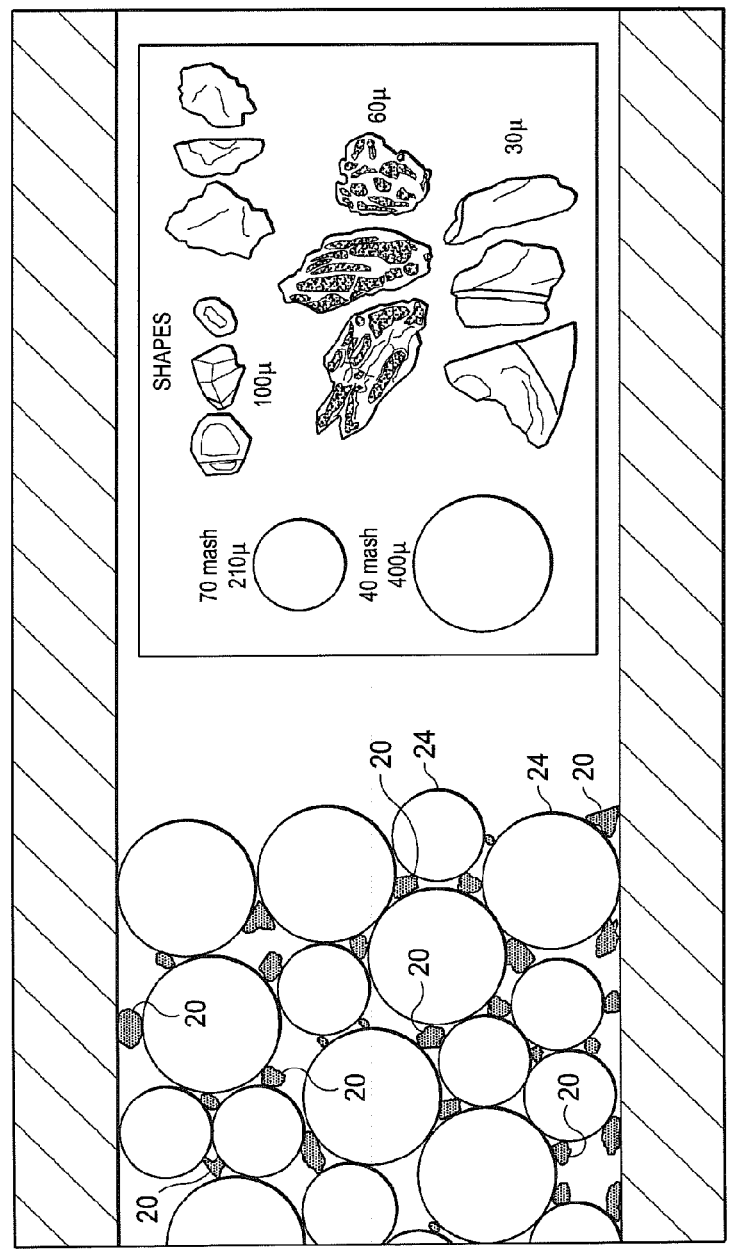
FIG. 9 is a schematic view of proppant particles having sharp edged particles dispersed therebetween in a formation fracture.

Still referring to FIG. 9, in one embodiment, the kinetic mixing material 20 of the present invention is comprised of light-weight particles (Types I, II), high-strength particles (Types I-V), and primarily chemically and thermodynamically stable particles. Example kinetic mixing particles of Types I-IV) includes particles having a particle geometry that acts like a mechanical locking mechanism between the interfaces of proppant grains 24, thereby increasing the coefficient of friction between the individual proppant grains 24, thereby creating a stable load-bearing, proppant-supported fracture. The particle types are discussed in greater detail below.

Particle Type I

Particle type I embeds deep into the boundary layer to produce excellent kinetic mixing in both the boundary layer and in the mixing zone. Type I particles increase dispersion of chemical and mineral additives. Type I particles increase fluid flow. The surface area of Type I particles is large compared to the mass of Type I particles. Therefore Type I particles stay in suspension well.

Figure 10:
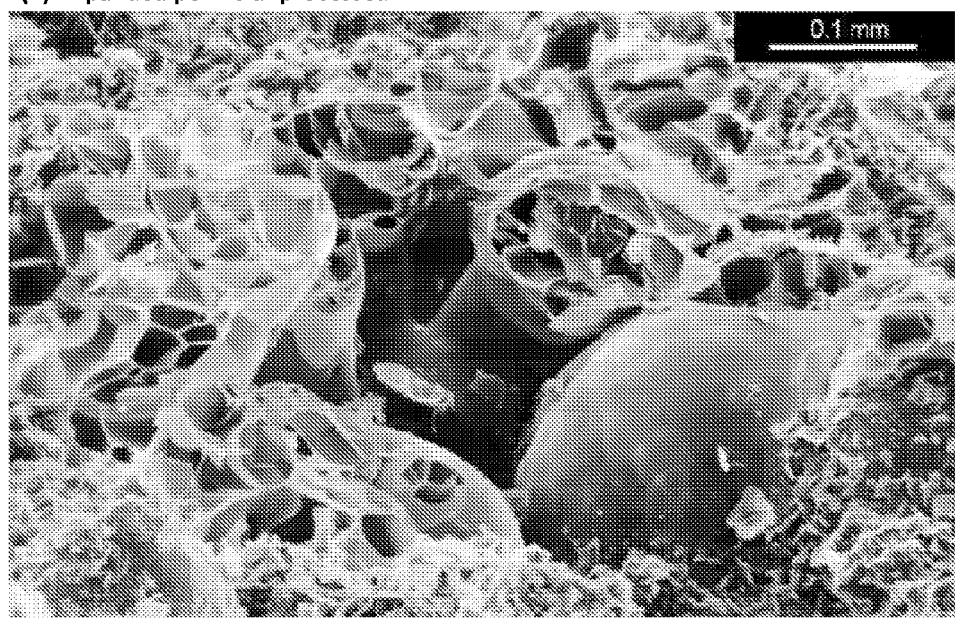
FIG. 10 is an SEM image of unprocessed expanded perlite.

Referring to FIG. 10, shown is expanded perlite that is unprocessed. Perlite is a mineable ore with no known environmental concerns and is readily available on most continents and is only surpassed in abundance by sand. Expanded perlite is produced through thermal expansion process which can be tailored to produce a variety of wall thicknesses of the bubbles. Expanded perlite clearly shows thin wall cellular structure and how it will deform under pressure. In one embodiment, perlite may be used in a raw unprocessed form, which is the most economic form of the material. Process equipment that is used for mixing and/or the high-pressure well environment may produce the desired particle shapes because of Perlite's ability to self-shape under pressure into boundary layer kinetic mixing particles. Perlite provides ideal mechanical interlocking properties to produce stable structural columns throughout a fracture when used in hydraulic fracturing fluid due to its sillier structure and its ability to self-shape. The approximate application size is 900μ to 10,000μ. The self-shaped size is estimated to be 100μ or less. This material produces excellent performance in the boundary layers having viscosity materials such as thermoplastics and drilling mud this kinetic mixing particle produces dispersion in a variety of viscosity materials from high low as well as being an excellent nucleating agent and foaming processes.

Figure 11:
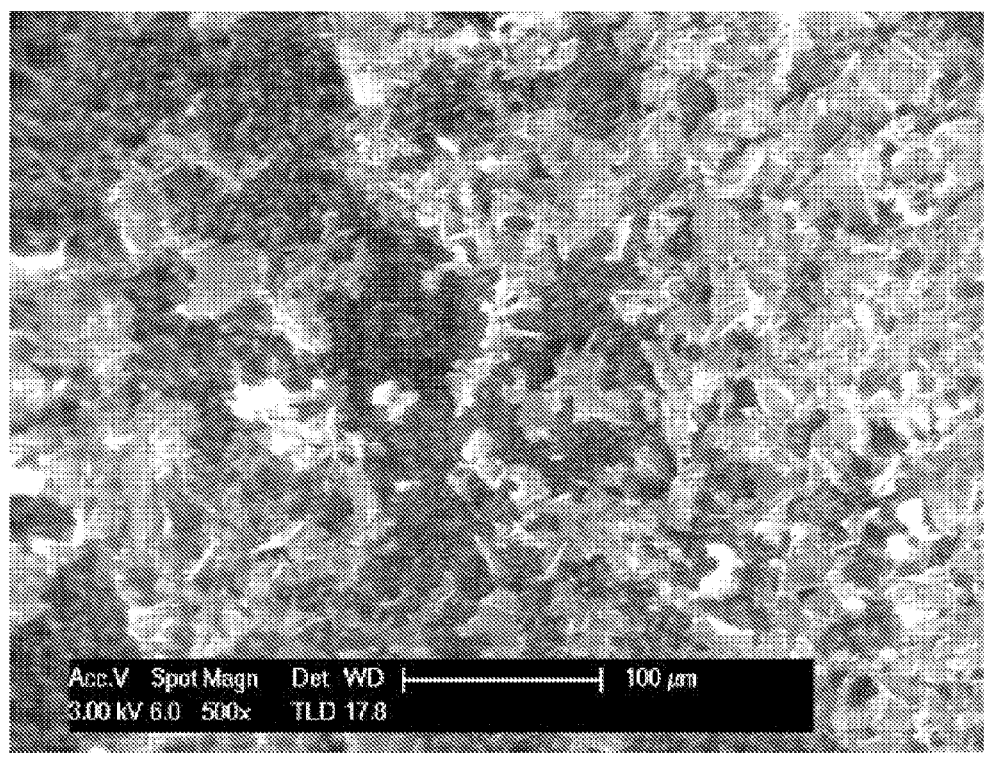
FIG. 11 is an SEM image of processed perlite at 500× magnification.

Referring to FIG. 11, shown is an image that demonstrates that the expanded perlite particles do not conglomerate and will flow easily among other process particles. Therefore, expanded perlite particles will easily disperse with minimal mixing equipment.

Figure 12:
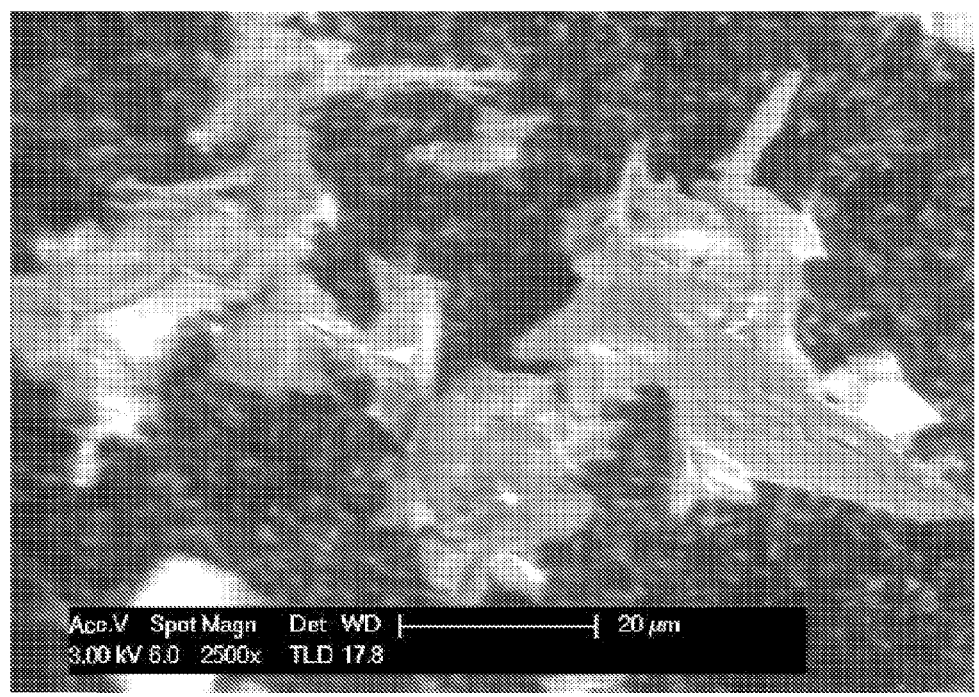
FIG. 12 is an SEM image of processed perlite at 2500× magnification.

Referring to FIG. 12, shown is an enlarged image of an expanded perlite particle showing a preferred structural shape for processed perlite particles. The particles may be described as having three-dimensional wedge-like sharp blades and points with a variety of sizes. The irregular shape promotes diverse kinetic boundary layer mixing. The expanded Perlite shown in FIG. 12 is extremely lightweight, having a density in the range of 0.1-0.15 g/cm. This allows for minimal fluid velocity to promote rotation of the particle. The bladelike characteristics easily capture the kinetic energy of the fluid flowing over the boundary layer while the jagged bladelike characteristics easily pierce into the boundary layer promoting agitation while maintaining adherence to the surface of the boundary layer. The preferred approximate application size is estimated to be 50μ to 900 nm This material produces excellent performance in the boundary layer of fluids of viscous materials such as thermoplastics and drilling mud. This kinetic mixing particle produces dispersion in a variety of fluids have viscosities ranging from high to low. Additionally, the particle is an excellent nucleating agent in foaming processes.

Figure 13:
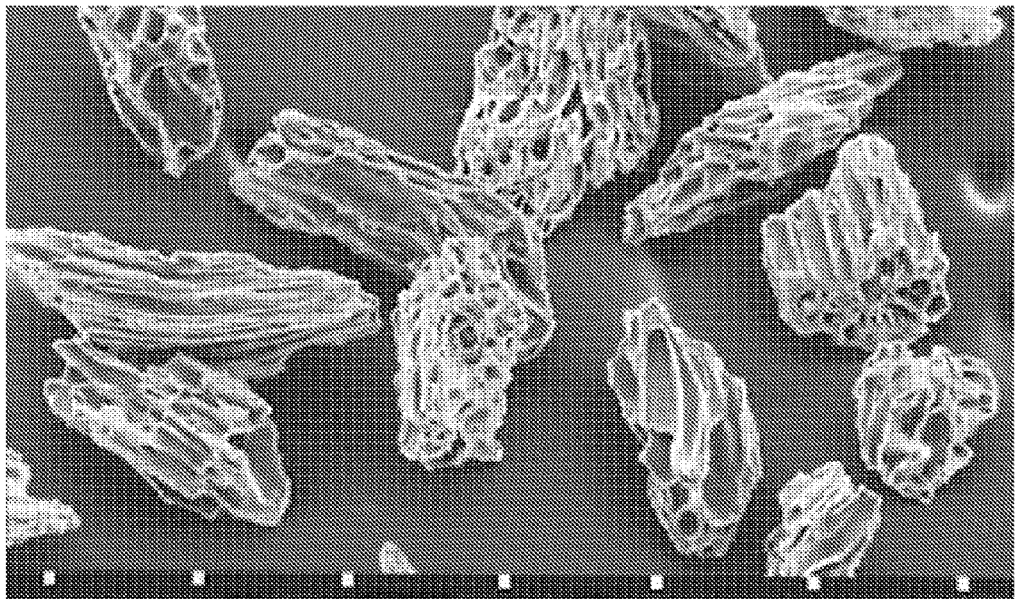
FIG. 13 is an SEM image of volcanic ash wherein each tick mark equals 100 microns.

Referring now to FIG. 13, shown is volcanic ash in its natural state. Volcanic ash exhibits similar characteristics to the characteristics of expanded perlite, discussed above, regarding the thin walled cellular structures. Volcanic ash is a naturally formed material that is readily mineable and that can be easily processed into a kinetic mixing material that produces kinetic boundary layer mixing. The volcanic ash material is also deformable, which makes it an ideal candidate for in-line processes to produce the desired shapes either by mixing or pressure applied during the pumping process in the wellbore. The volcanic ash material provides the same wedging effects as the Perlite discussed above to produce mechanical locking between proppant grains, thereby producing stable fracture openings. The preferred approximate application size is 900μ to 10,000μ. The self-shaping size is estimated to be 100μ or less.

Figure 14:
FIG. 14 is an SEM image of volcanic ash wherein each tick mark equals 50 microns.

Referring now to FIG. 14, shown is a plurality of crushed volcanic ash particles. FIG. 14 illustrates that any crushed particle form tends to produce three-dimensional bladelike characteristics, which will interact in the boundary layer in a similar manner to expanded perlite, discussed above, in its processed formed. This material is larger than the processed perlite making its application more appropriate to higher viscosity materials such as thermoplastics, lubricating grease and drilling mud. However, the material is suitable for use as mechanical interlock between proppants and the fracture regardless of the viscosity of the fracturing fluid being pumped. The preferred approximate application size is estimated to be between 80μ to 30μ. This material will function similar to the processed perlite materials discussed above.

Figure 15:
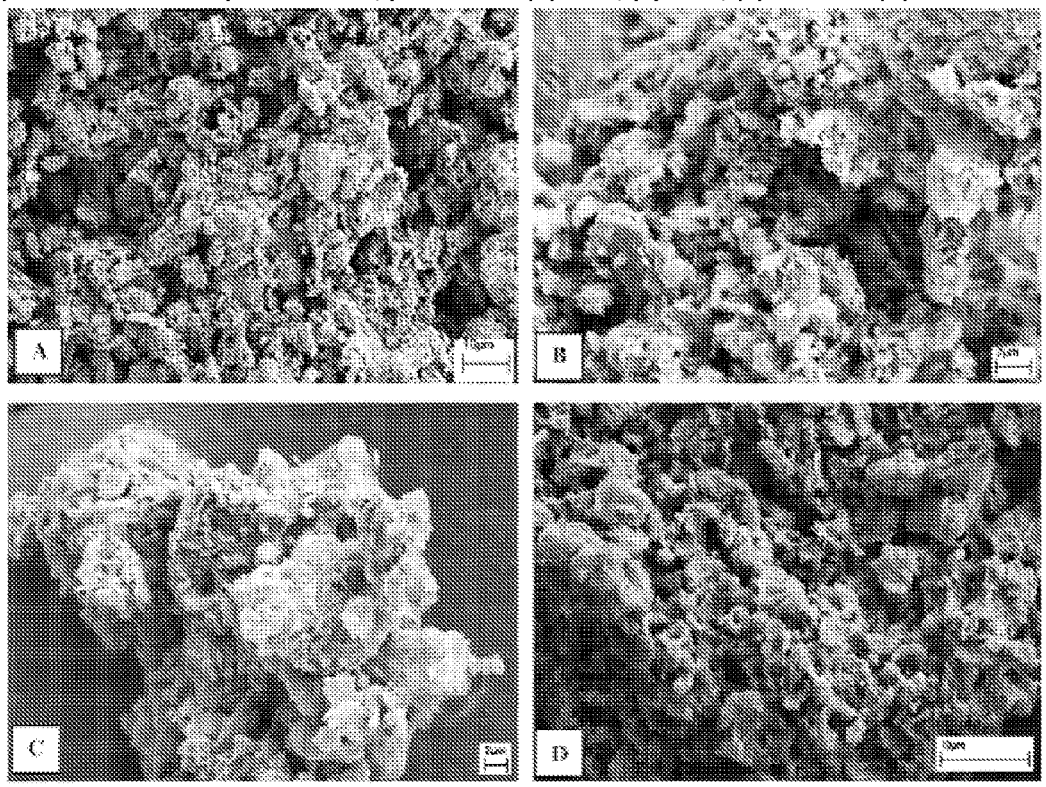
FIG. 15A is an SEM image of natural zeolite-templated carbon produced at 700 C.
FIG. 15B is an SEM image of natural zeolite-templated carbon produced at 800 C.
FIG. 15C is an SEM image of natural zeolite-templated carbon produced at 900 C.
FIG. 15D is an SEM image of natural zeolite-templated carbon produced at 1,000 C.

Referring now to FIGS. 15A-15D, shown is natural zeolite-templated carbon produced at 700 C (FIG. 15A), 800 C (FIG. 15B), 900 C (FIG. 15C), and 1000 C (FIG. 15 D). Zeolite is a readily mineable material with small pore sizes that can be processed to produce desired surface characteristics of kinetic mixing material. Processed perlite and crushed volcanic ash have similar boundary layer interaction capabilities. Zeolites have small porosity and can, therefore, produce active kinetic boundary layer mixing particles in the nano range. The preferred approximate application size is estimated to be between 900 nm to 600 nm. These materials are may be too small to be used as mechanical interlocks in any hydraulic fracturing formation. However, the particles are ideal for friction reduction in medium viscosity materials such as crude oil for hydraulic fracturing.

Figure 16:
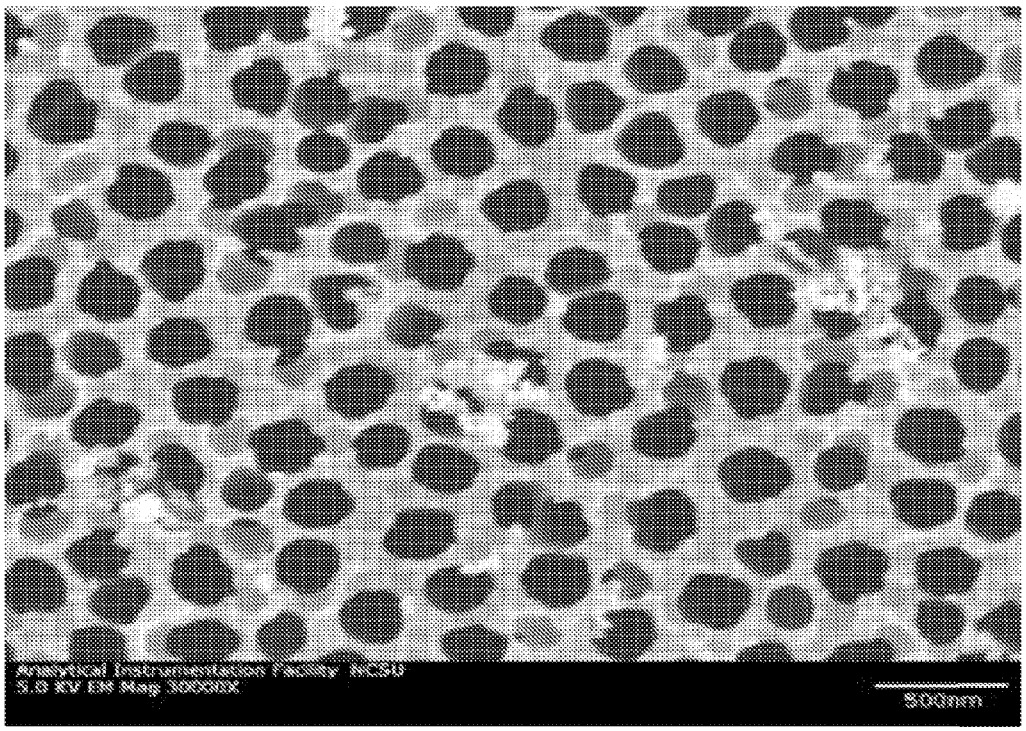
FIG. 16 is an SEM image of nano porous alumina membrane at 30000× magnification.

Referring now to FIG. 16, shown is a nano porous alumina membrane having a cellular structure that will fracture and create particle characteristics similar to any force material. Material fractures will take place at the thin walls, not at the intersections, thereby producing characteristics similar to the previously discussed materials, which are ideal for boundary layer kinetic mixing particles. The preferred approximate application size is estimated to be between 500 nm to 300 nm. The particle sizes of this material are more appropriately applied to medium to low viscosity fluids such as refined oils.

Figure 17:
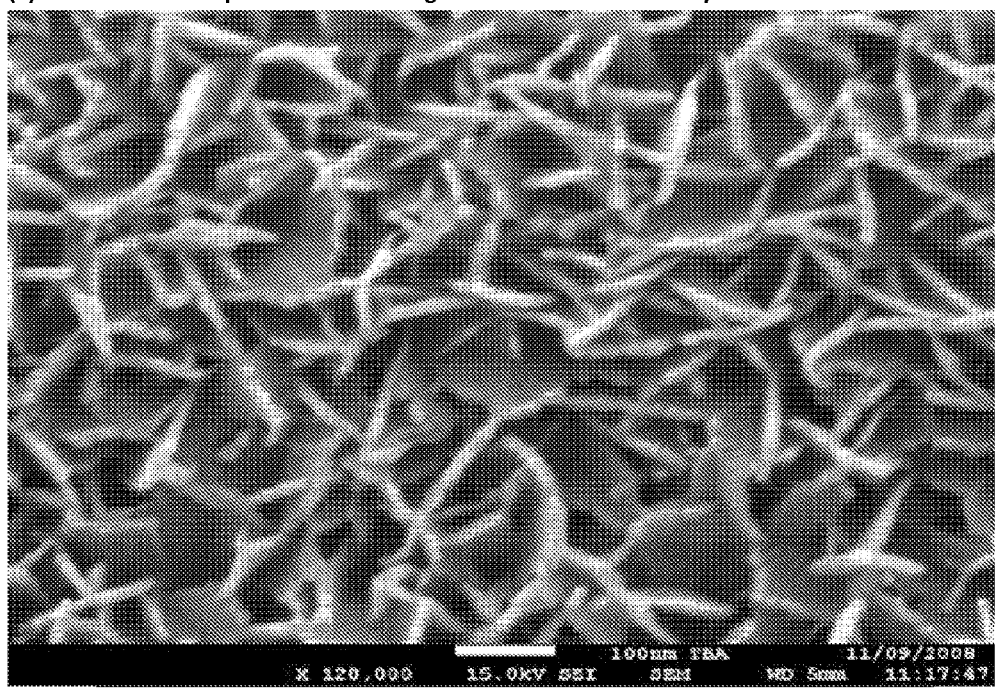
FIG. 17 is an SEM image of pseudoboehmite phase $Al_2O_3xH_2O$ grown over aluminum alloy AA2024-T3 at 120,000 magnifcation.

Referring now to FIG. 17, shown is a pseudoboehmite phase $Al_2O_3xH_2O$ grown over aluminum alloy AA2024-T3. Visible are bladelike characteristics on the surface of processed Perlite. The fracture point of this material is at the thin blade faces between intersections where one or more blades join. Fractures will produce a three-dimensional blade shape similar to a "Y", "V" or "X" shape or similar combinations of geometric shapes. The preferred approximate application size is estimated to be from 150 nm to 50 nm. The acceptable particle size range of this material makes it useful in water, radiator fluid, shear thinning hydraulic fracturing fluids.

Particle Type II

Particle type II achieves medium penetration into a boundary layer for producing minimal kinetic boundary layer mixing and minimal dispersion capabilities. Type II particles result in minimal enhanced fluid flow improvement and are easily suspended based on the large surface and extremely low mass of Type II particles.

The majority of materials that form hollow spheres can undergo mechanical processing to produce egg shell-like fragment with surface characteristics to promote kinetic boundary layer mixing.

Figure 18:
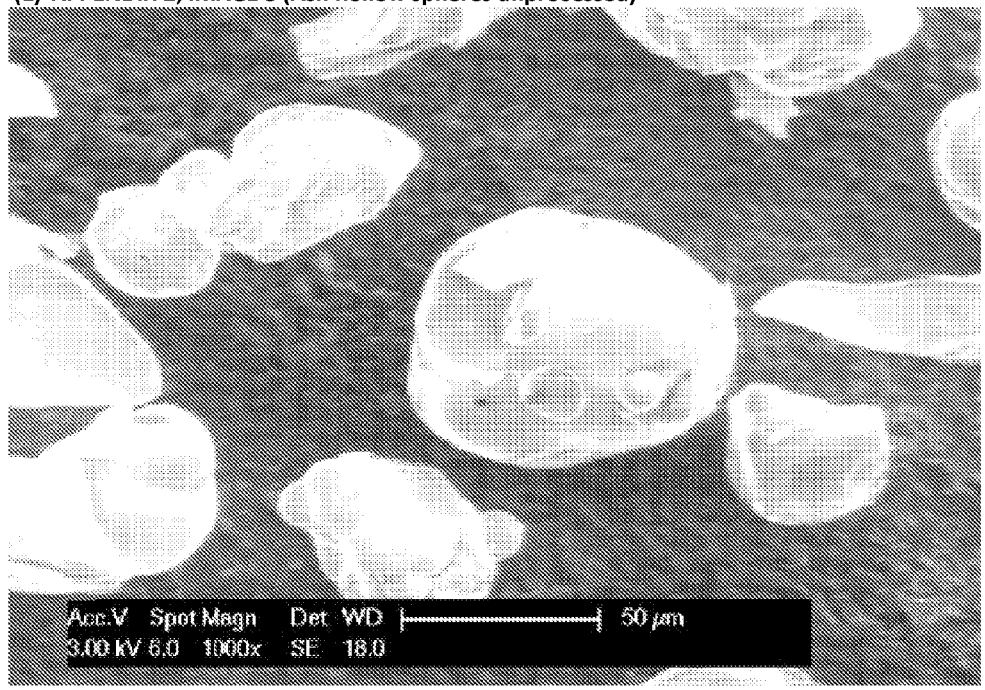
FIG. 18 is an SEM image of unprocessed hollow ash spheres at 1000× magnification.
Figure 19:
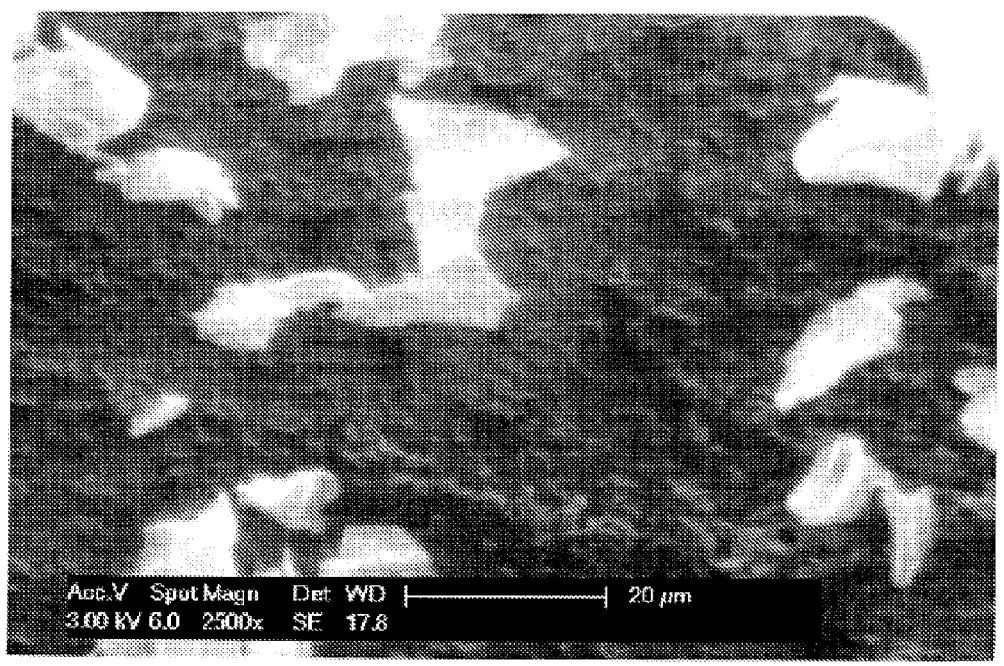
FIG. 19 is an SEM image of processed hollow ash spheres at 2500× magnification.
Figure 20:
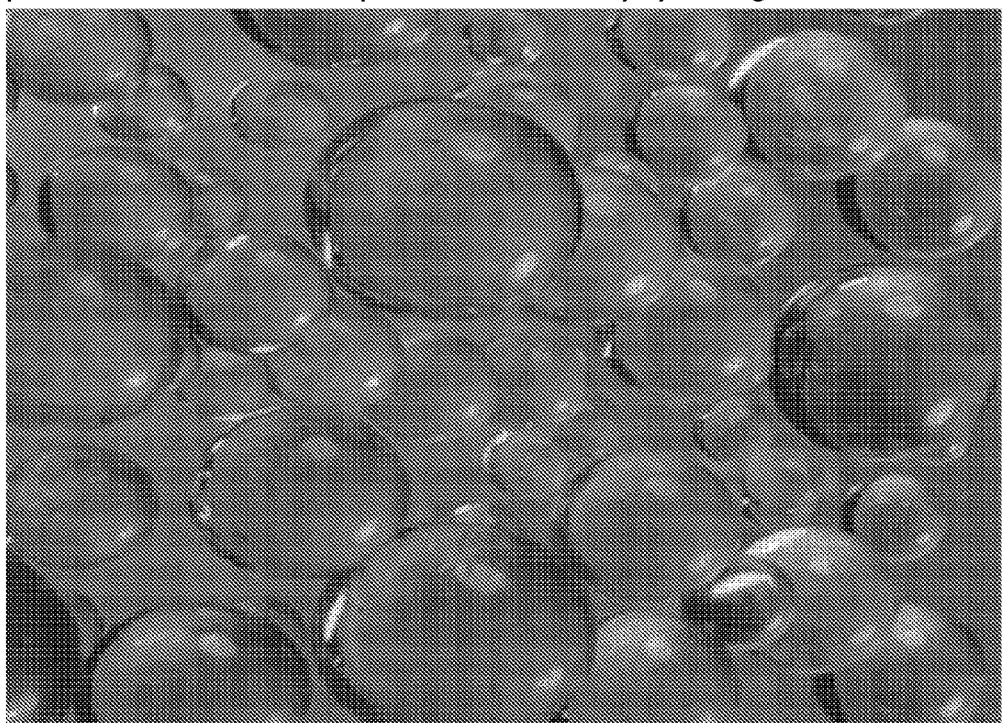
FIG. 20 is an SEM image of 3M® glass bubbles.
Figure 21:
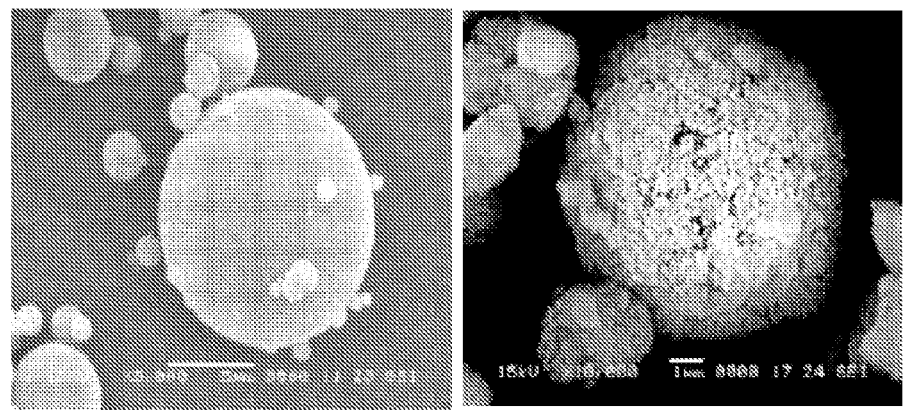
FIG. 21A is an SEM image of fly ash particles at 5,000× magnification.
FIG. 21B is an SEM image of fly ash particles at 10,000× magnification.
Figure 22:
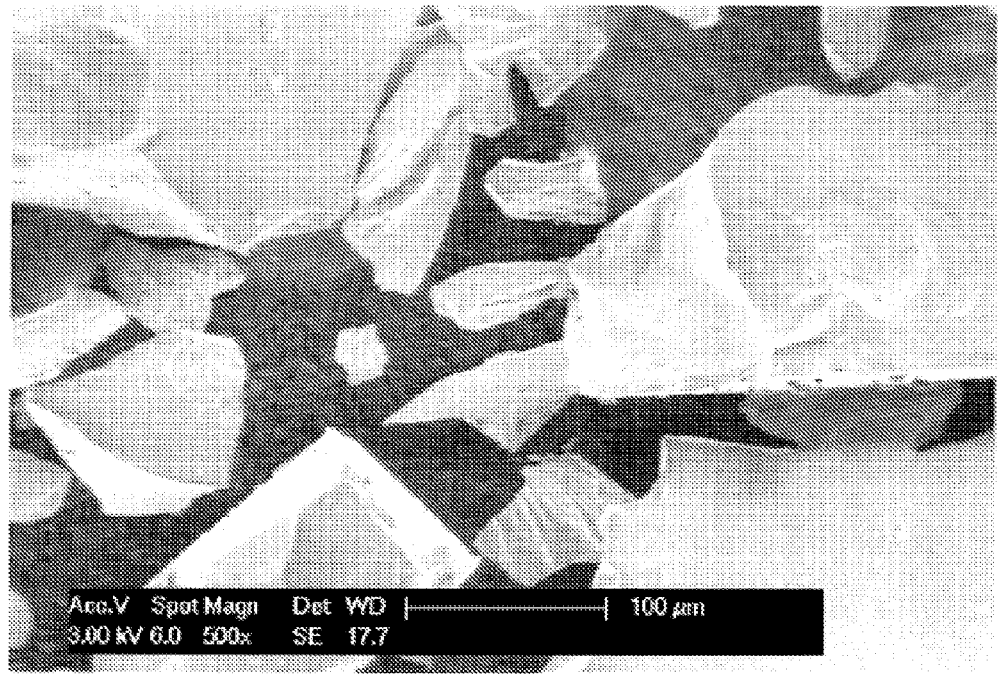
FIG. 22 is an SEM image of recycled glass at 500× magnification.
Figure 23:
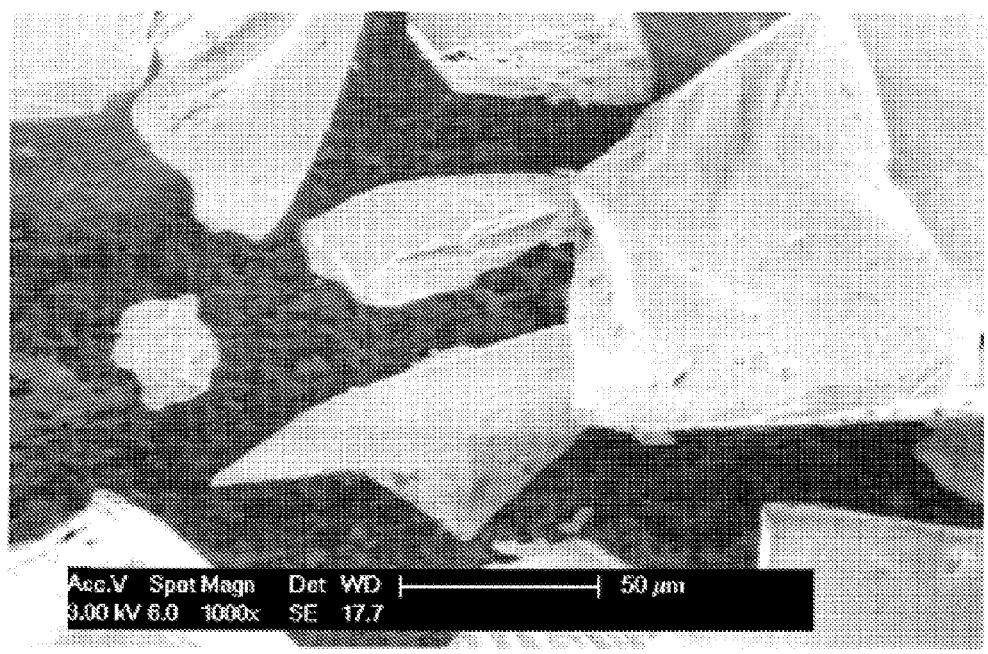
FIG. 23 is an SEM image of recycled glass at 1,000× magnification.
Figure 24:
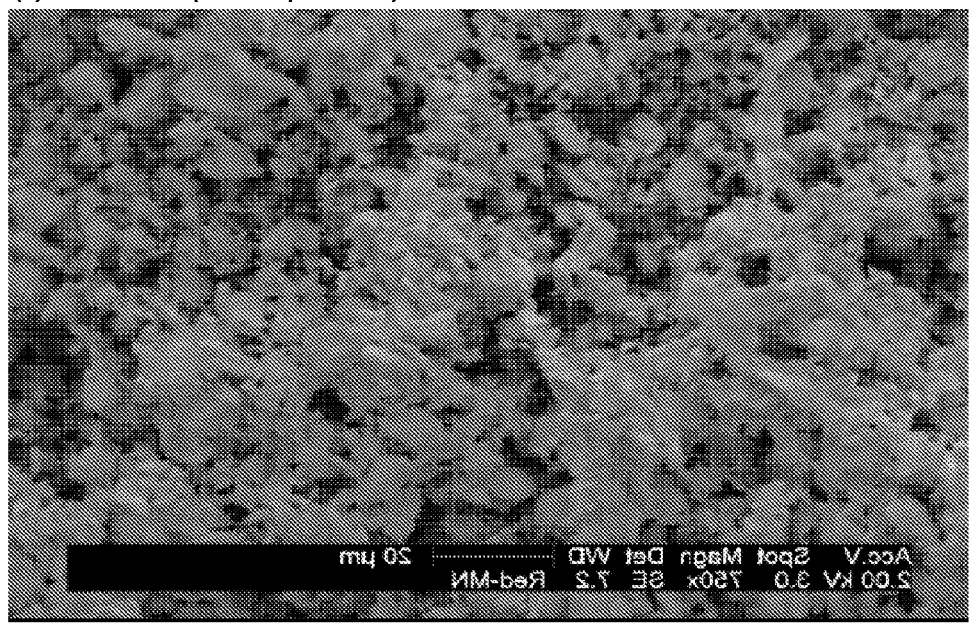
FIG. 24 is an SEM image of processed red volcanic rock at 750× magnification.
Figure 26A:
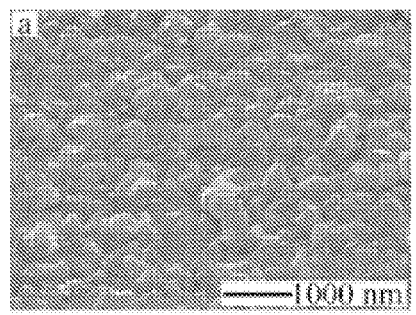
FIG. 26A is an SEM image of zeolite Y, A and silicate 1 synthesized for 1 hour.
Figure 26B:
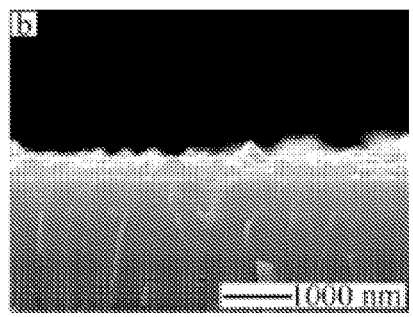
FIG. 26B is an SEM image of zeolite Y, A and silicate 1 synthesized for 1 hour.
Figure 26C:
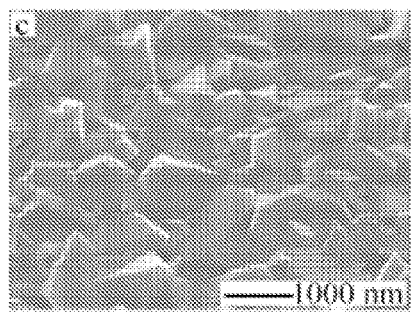
FIG. 26C is an SEM image of zeolite Y, A and silicate 1 synthesized for 6 hours.
Figure 26D:
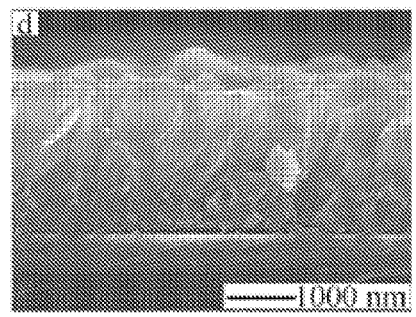
FIG. 26D is an SEM image of zeolite Y, A and silicate 1 synthesized for 6 hours.
Figure 26E:
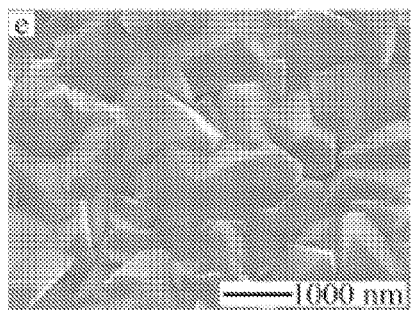
FIG. 26E is an SEM image of zeolite Y, A and silicate 1 synthesized for 12 hours.
Figure 26F:
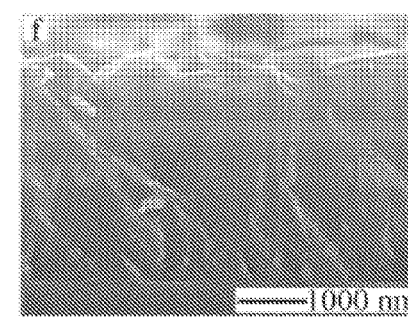
FIG. 26F is an SEM image of zeolite Y, A and silicate 1 synthesized for 12 hours.
Figure 27:
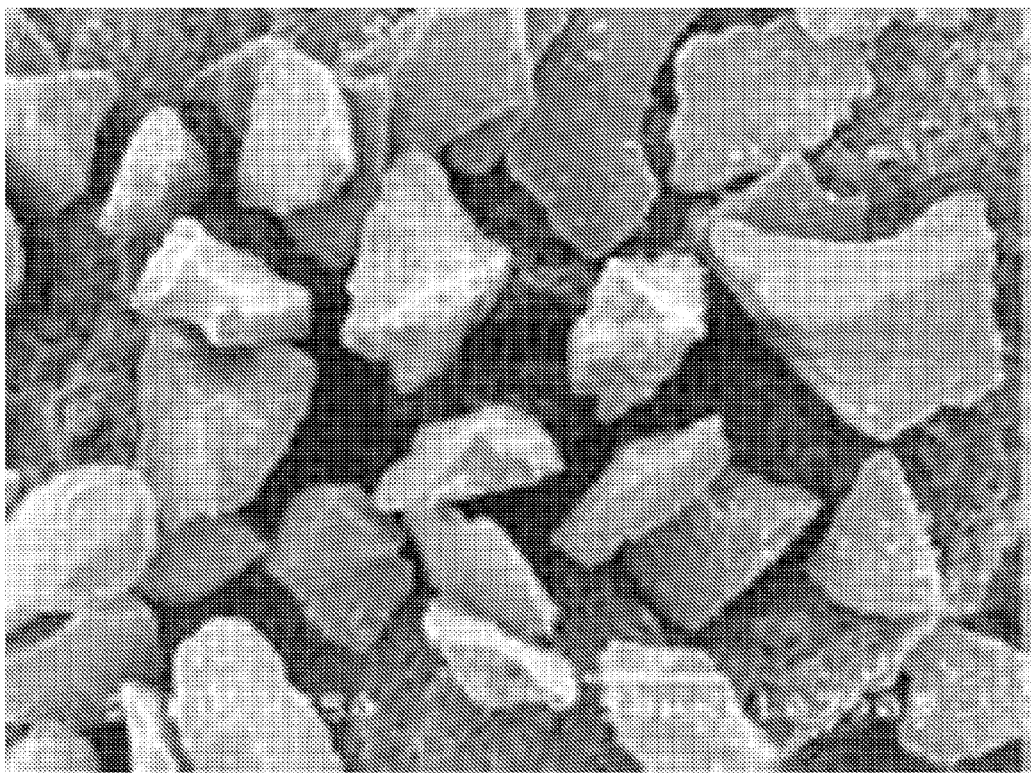
FIG. 27 is an SEM image of phosphocalcic hydroxyapatite.
Figure 28A:
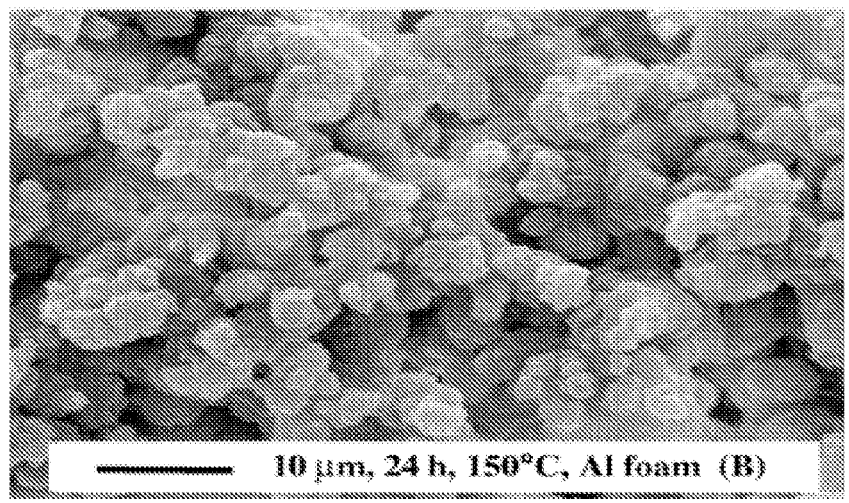
FIG. 28A is an SEM image of Al MFI agglomerates.
Figure 28B:
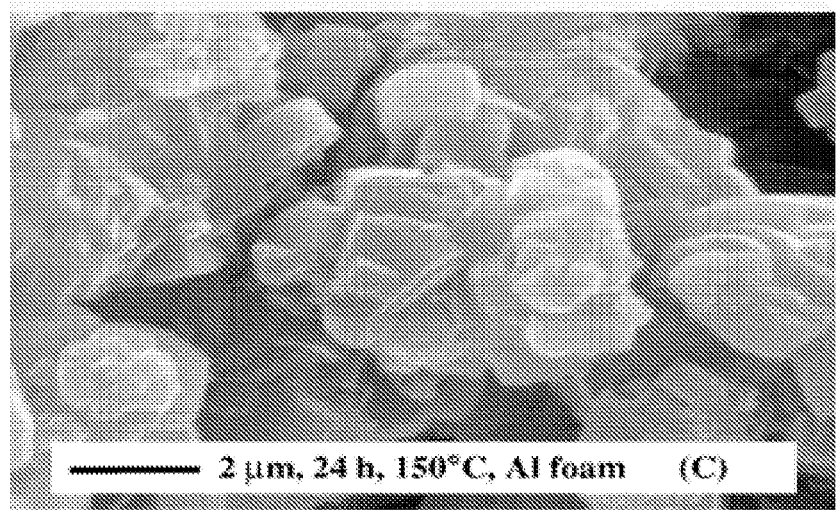
FIG. 28B is an SEM image of Al MFI agglomerates.

Referring now to FIG. 18, shown is an image of unprocessed hollow spheres of ash. Ash is mineable material that can undergo self-shaping to produce kinetic boundary layer mixing particle characteristics depending on process conditions. The preferred approximate application size is estimated to be 80μ to 20μ prior to self-shaping processes. Self-shaping can be achieved either by mechanical mixing wellbore or pressure producing, either of which produce a crushing effect. This material could be used for a mechanical locking system for proppants to provide dimensional stability to a formation fracture.

Referring now to FIG. 19, shown are processed hollow spheres of ash. The fractured ash spheres will tumble in a boundary layer similar to a piece of paper on a sidewalk. The slight curve of the material is similar to a piece of egg shell in that the material tends to tumble because of its light weight and slight curvature. Preferred approximate application size is estimated to be between 50 nm to 5 nm. This material will function similar to expanded perlite but it possesses an inferior disbursing capability because its geometric shape does not allow particles to become physically locked into the boundary layer due to the fact that two or more blades produces more resistance and better agitation as a particle tumbles along the boundary layer. This material reduces friction of heavy viscosity materials such as thermoplastics and drilling mud.

Referring now to FIG. 20, shown are 3M® glass bubbles that can be processed into broken eggshell-like structure to produce surface characteristics to promote kinetic boundary layer mixing. The particles that are similar in performance and application to the ash hollow spheres except that the wall thickness and diameter as well as strength can be tailored based on process conditions and raw material selections. These man-made materials can be used in food grade applications. The preferred approximate application size is estimated to be from 80μ to 5μ prior to self-shaping processes either by mechanical mixing or by wellbore pressure that produce a crushing effect.

Referring now to FIG. 21, shown is an SEM photograph of fly ash particles×5000 (FIG. 21A) and zeolite particles×10000 (FIG. 21B). The particles comprise hollow spheres. Fly ash is a common waste product produced by combustion. Fly ash particles are readily available and economically affordable. Zeolite can be mined and made by an inexpensive synthetic process to produce hundreds of thousands of variations. Therefore, desirable characteristics of the structure illustrated by this hollow zeolite sphere can be selected. The zeolite particle shown is a hybrid particle, in that the particle will have surface characteristic similar to processed perlite and the particle retains a semi-curved shape like an egg shell of a crushed hollow sphere. The preferred approximate application size is estimated to be from 5μ to 800 nm prior to self-shaping processes. Self-shaping may be accomplished either by mechanical mixing or by wellbore pressure to produce a crushing effect. The small size of these particles make the particles less than ideal for use as a mechanical anchoring system for proppants, but can be used for medium viscosity materials.

Particle Type III

Particle type III result in minimal penetration into a boundary layer. Type III particles result in minimal kinetic mixing in the boundary layer and have excellent dispersion characteristics with both soft chemical and hard mineral additives.

Type II particles increase fluid flow and do not suspend well but are easily mixed back into suspension.

Some solid materials have the ability to produce conchordial fracturing to produce surface characteristics to promote kinetic boundary layer mixing.

Referring now to FIGS. 22 and 23, shown are images of recycled glass. Recycled glass is a readily available man-made material that is inexpensive and easily processed into kinetic boundary layer mixing particles. The sharp bladelike characteristics of the particles are produced by conchordial fracturing similar to a variety of other mineable minerals. The bladelike characteristics of these particles are not thin like perlite. The density of the particles is proportional to the solid that is made from. The sharp blades interact with a fluid boundary layer in a manner similar to the interaction of perlite except that the recycled glass particles require a viscous material and a robust flow rate to produce rotation. Processed recycled glass has no static charge. Therefore, recycled glass produces no agglomeration during dispersion. However, because of its high density it can settle out of the fluid easier than other low-density materials. The preferred approximate application sizes are estimated to be between 200μ to 5μ. This material produces good performance in boundary layers of heavy viscosity fluids with high flow rates such as thermoplastics and drilling mud. This kinetic mixing particle produces dispersion. This material is suitable for producing good mechanical interlocks between proppants, thereby shoring up fractures. The smooth surface of the particles reduces friction allowing good well production.

Referring now to FIG. 24, shown is an image of processed red lava volcanic rock particles. Lava is a readily available mineable material. A typical use for lava is for use as landscape rocks in the American Southwest and in California. This material undergoes conchordial fracturing and produces characteristics similar to recycled grass. However, the fractured surfaces possess more surface roughness than the smooth surface of the recycled glass. The surface characteristics produce a slightly more grinding effect coupled with bladelike cutting of a flowing fluid. Therefore, the particles not only tumble, they have an abrasive effect on the fluid stream. The volcanic material disperses semi-hard materials throughout viscous mediums such as fire retardants, titanium, calcium carbonate, dioxide etc. The preferred approximate application sizes are estimated to be between 40μ to 1μ. This material produces good performance in the boundary layer of flowing heavy viscosity materials at high flow rates such as thermoplastics and drilling mud. This kinetic mixing particle produces dispersion. This material is can produce good mechanical interlocks between proppants.

Referring now to FIGS. 25A-25D, FIGS. 25A-C show sand particles that have the ability to fracture, which produces appropriate surface characteristics for kinetic boundary layer mixing particles. The images show particles having similar physical properties to recycled glass, which produces similar benefits. Images A, B, D have good surface characteristics for interacting with the boundary layer even though they are different. Image A shows some bladelike characteristics but good surface roughness along edges of the particle to promote boundary layer surface interaction but will require higher velocity flow rates to produce tumbling. Image B has similar surface characteristics to the surface characteristics of recycled glass as discussed previously. Image D shows particles having a good surface roughness to promote interaction similar to the interaction of these materials generally. The performance of these particles is similar to the performance of recycled glass. Sand is an abundant material that is mineable and can be processed inexpensively to produce desired fractured shapes in a variety of sizes. Sand is considered environmentally friendly because it is a natural material. The preferred approximate application sizes are estimated to be between 250μ to 5μ. This material produces good performance in the boundary layers of heavy viscosity materials at high flow rates such as thermoplastics and drilling mud. This kinetic mixing particle produces dispersion. This material is can produce good mechanical interlocks between proppants, thereby shoring up fractures. The smooth surface of the particles reduces friction, thereby allowing good well production.

Referring now to FIGS. 26A-26F, shown are images of Zeolite Y, A and Silicate-1. The SEM images of films synthesized for 1 h (a,b), 6 h (c, d) and 12 h (e, f) in the bottom part of a synthesis solution at 100 C. These materials can be processed to produce nano sized kinetic boundary layer mixing particles. This material is synthetically grown and is limited in quantity and is, therefore, expensive. All six images, i.e., images a, b, c, d, e, f clearly show the ability of this material to produce conchordial fracturing with bladelike structures similar to the structures mentioned above. The preferred approximate application size is estimated to be between 1000 nm to 500 nm. The particle size range of this material makes it useful in medium viscosity fluids such as refined oils.

Referring now to FIG. 27, shown is phosphocalcic hydroxyapatite, formula Ca10(PO4)6(OH)2, forms part of the crystallographic family of apatites, which are isomorphic compounds with the same hexagonal structure. This is the calcium phosphate compound most commonly used for biomaterial. Hydroxyapatite is mainly used for medical applications. The surface characteristics and performance are similar to those of red lava particles, discussed above, but this image shows a better surface roughness than the particle shown in the red lava image.

Particle Type IV

Some solid clustering material have the ability to produce fracturing of the cluster structure to produce individual unique uniform materials that produce surface characteristics to promote kinetic boundary layer mixing.

Referring now to FIG. 28A and 28B, shown are SEM images of Al foam/zeolite composites after 24 h crystallization tie at different magnifications. FIG. 28A shows an AL form/zeolite strut. FIG. 28B shows MFI agglomerates. The two images that show an inherent structure of this material that will readily fracture upon mechanical processing to produce irregular shaped clusters of the individual uniquely formed particles. The more diverse a material's surface characteristics, the better the material will interact with the sticky nonslip zone of a flowing fluid's boundary layer to produce kinetic boundary layer mixing. This material possesses flowerlike buds with protruding random 90° corners that are sharp and well defined. The corners will promote mechanical agitation of the boundary layer. The particles also have a semi-spherical or cylinder-like shapes that will allow the material to roll or tumble while maintaining contact with the boundary layer due to the diverse surface characteristics. The preferred approximate application size of the particles is estimated to be between 20μ to 1μ. This material could be used in a high viscosity fluid. The surface characteristics will produce excellent dispersion of hardened materials such as fire retardants, zinc oxide, and calcium carbonate. As this material is rolled, the block-like formation acts like miniature hammer mills that chip away at the materials impacting against the boundary layer as fluid flows by.

Referring now to FIGS. 29A and 29B, shown is an SEM image of microcrystalline zeolite Y (FIG. 29A) and an SEM image of nanocrystalline zeolite Y (FIG. 29B). The particles have all the same characteristics on the nano level as those mentioned in the foam/zeolite, above. In 29A, the main semi-flat particle in the center of the image is approximately 400 nm. In 29B, the multifaceted dots are less than 100 nm in particle size. Under mechanical processing, these materials can be fractured into diverse kinetic boundary layer mixing particles. The preferred approximate application size is estimated for the cluster material of 29A to be between 10μ to 400 nm and for cluster material of 29B to be between 50 nm to 150 nm. Under high mechanical sheer, these clustering materials have the ability to self-shape by fracturing the most resistant particle that is preventing the cluster particle from rolling easily. Due to their dynamic random rotational ability, these cluster materials are excellent for use as friction modifiers.

Figure 30:
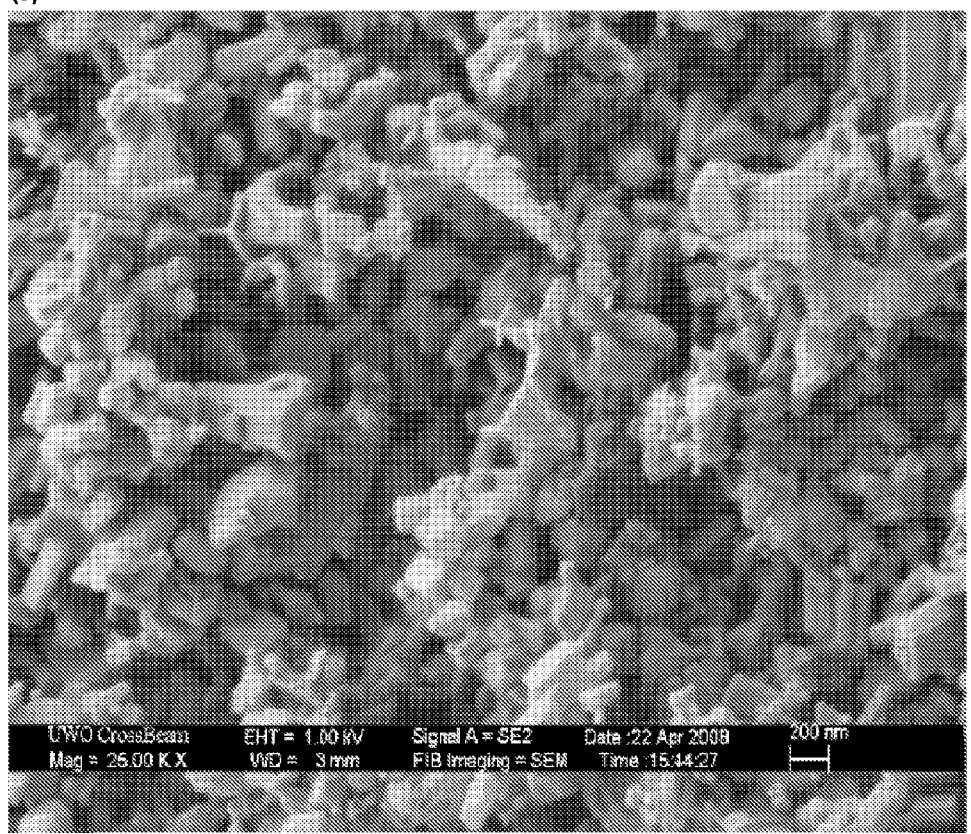
FIG. 30 is an SEM image of ZnO, 50~150 nm.
Figure 33:
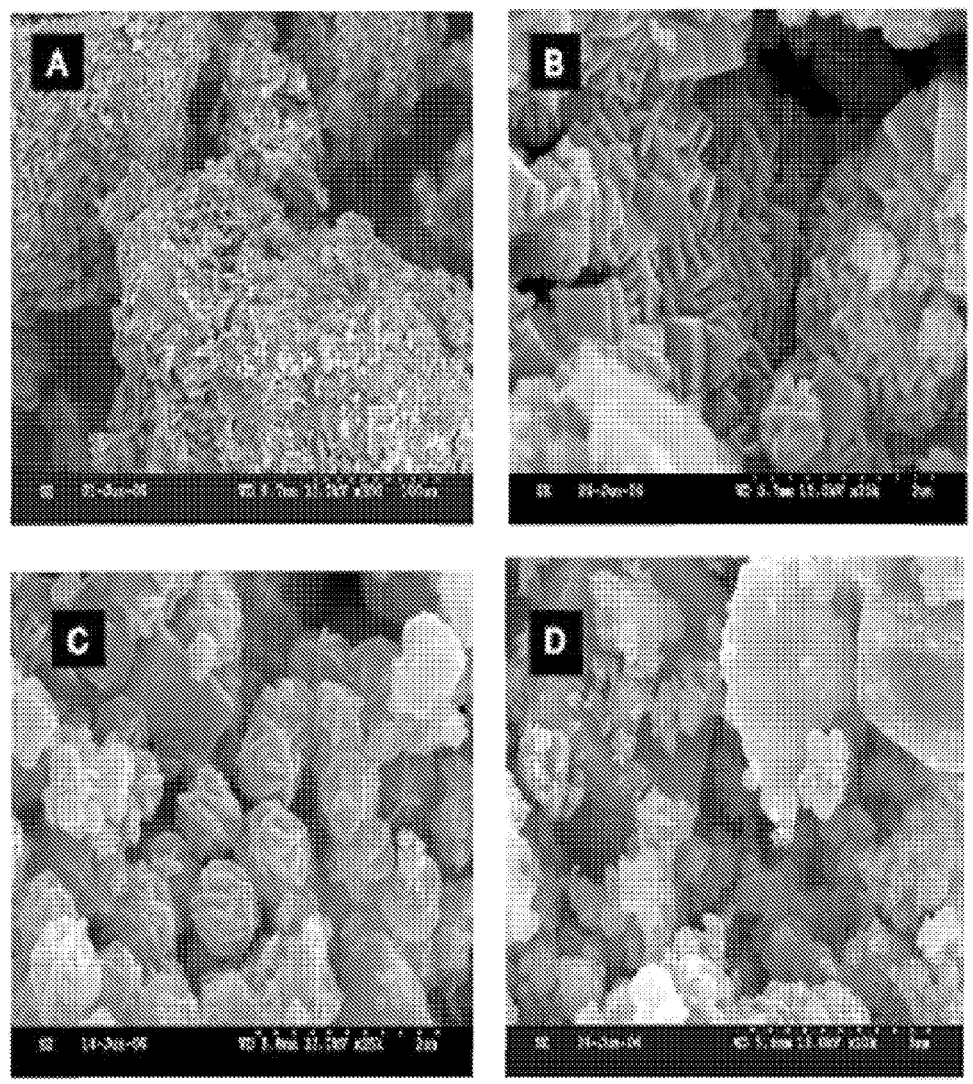
FIG. 33A is an SEM image of fused ash at 1.5N at 100° C.
FIG. 33B is an SEM image of fused ash at 1.5N at 100° C. 6 hours showing unnamed zeolite.
FIG. 33C is an SEM image of fused ash at 1.5N at 100° C. 24 hours showing cubic zeolite.
FIG. 33D is an SEM image of fused ash at 1.5N at 100° C. 72 hours showing unnamed zeolite and Gibbsite large crystal.
Figure 34A:
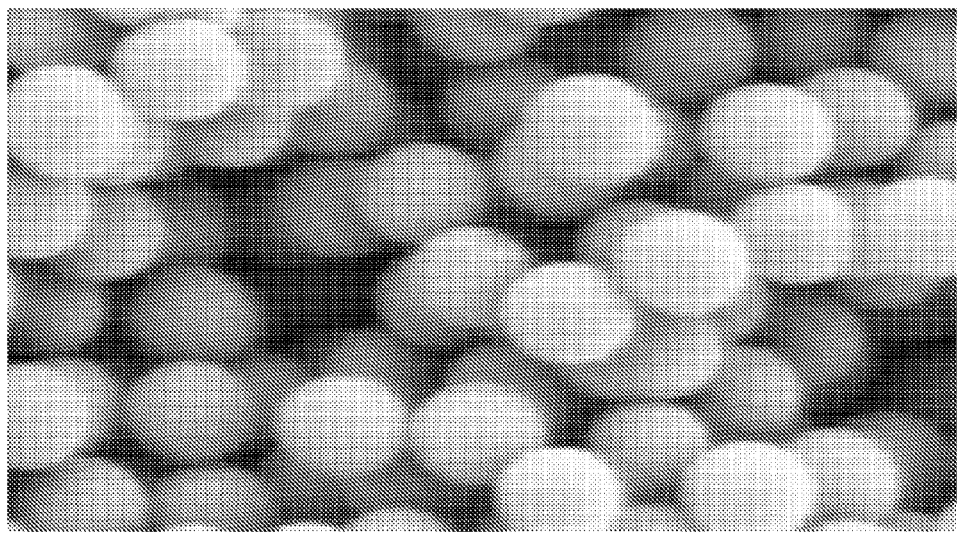
FIG. 34A is an SEM image of 2.5 um uniform plain Al2O3 nanospheres.
Figure 34B:
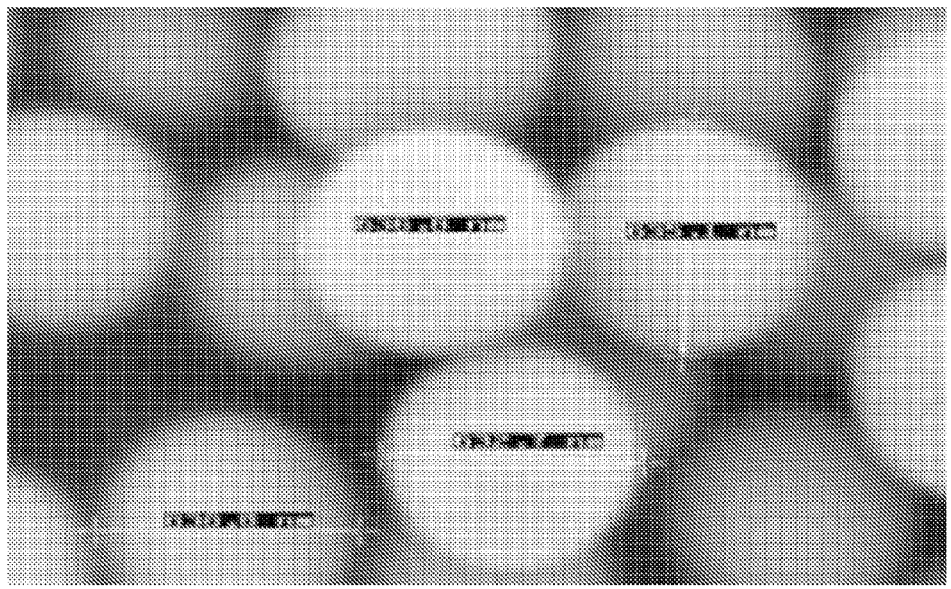
FIG. 34B is an SEM image of 635 nm uniform plain Al2O3 nanospheres.
Figure 36:
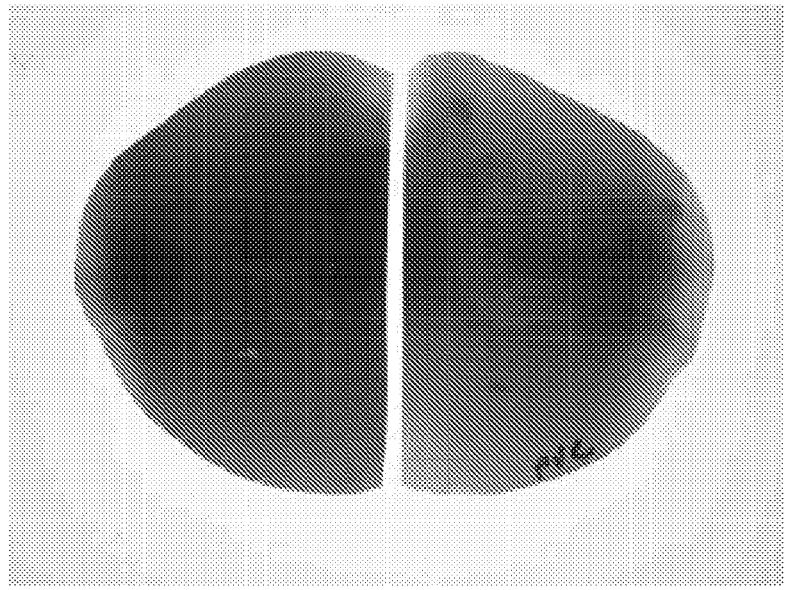
FIG. 36 shows two samples of rigid PVC with the same pigment loading in both samples wherein one sample includes kinetic boundary layer mixing particles.
Figure 37:
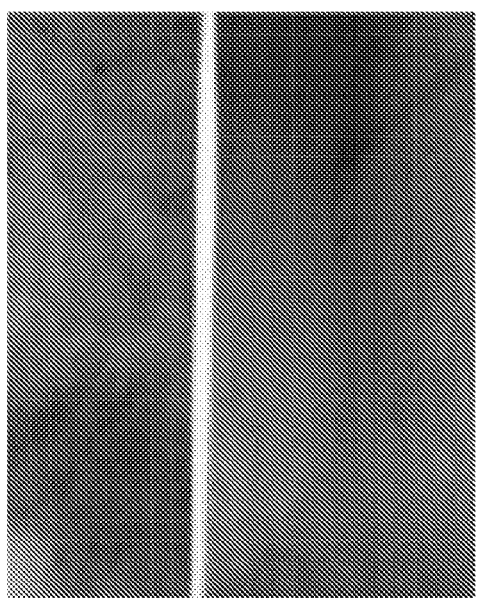
FIG. 37 shows two samples of polycarbonate with the same pigment loading in both samples wherein one sample includes kinetic boundary layer mixing particles.
Figure 38:
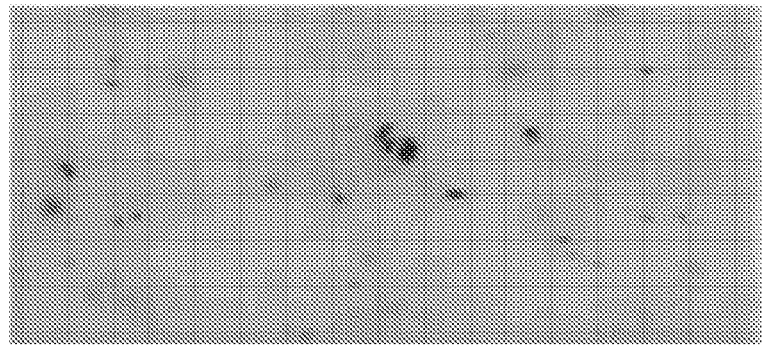
FIG. 38 shows a rigid PVC with ABS spots.
Figure 39:
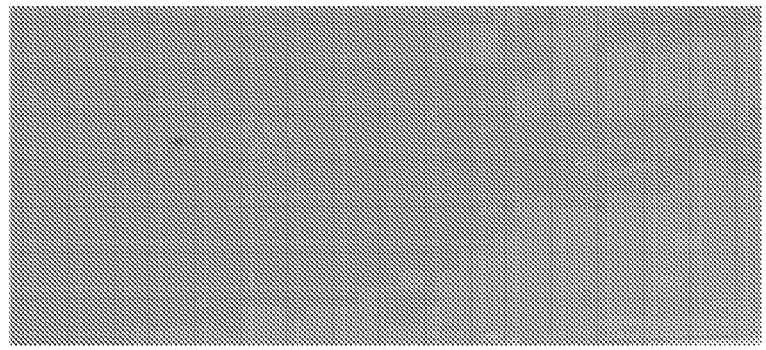
FIG. 39 shows PVC and ABS mixed together.

Referring now to FIG. 30, shown are zinc oxide particles of 50 nm to 150 nm. Zinc oxide is an inexpensive nano powder that can be specialized to be hydrophobic or to be more hydrophilic depending on the desired application. Zinc oxide forms clusters having extremely random shapes This material works very well due to its resulting random rotational movement in a flowing fluid. The particles have diverse surface characteristics with 90° corners that create bladelike characteristics in diverse shapes. Surface characteristics include protruding arms that are conglomerated together in various shapes such as cylinders, rectangles, cues, Y-shaped particles, X-shaped particles, octagons, pentagon, triangles, diamonds etc. Because these materials are made out of clusters having diverse shapes the materials produce enormous friction reduction because the boundary layer is churned to be as close to turbulent as possible by diverse mechanical mixing while still maintaining a laminar fluid flow.

Particle Type V

Figure 40:
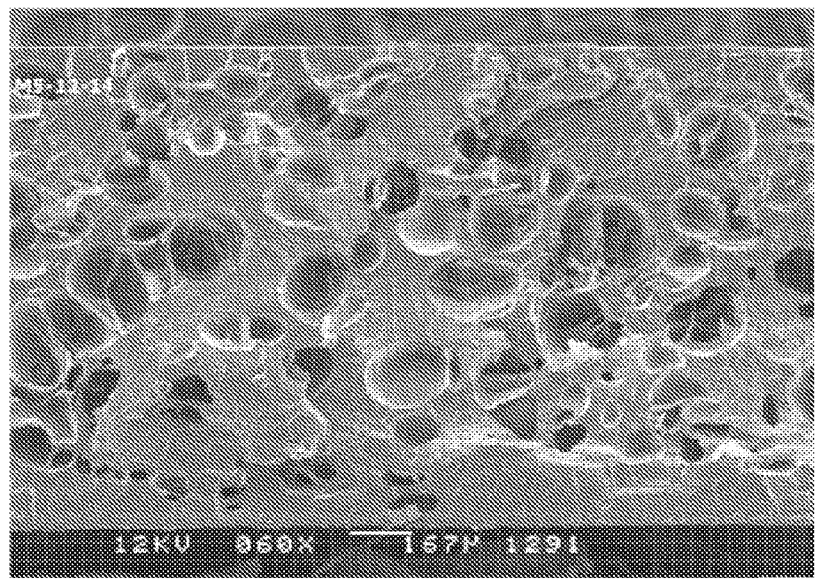
FIG. 40 sows a base polypropylene foam with direct gas injection, no additive, wherein the cells size is 163 micron.
Figure 41:
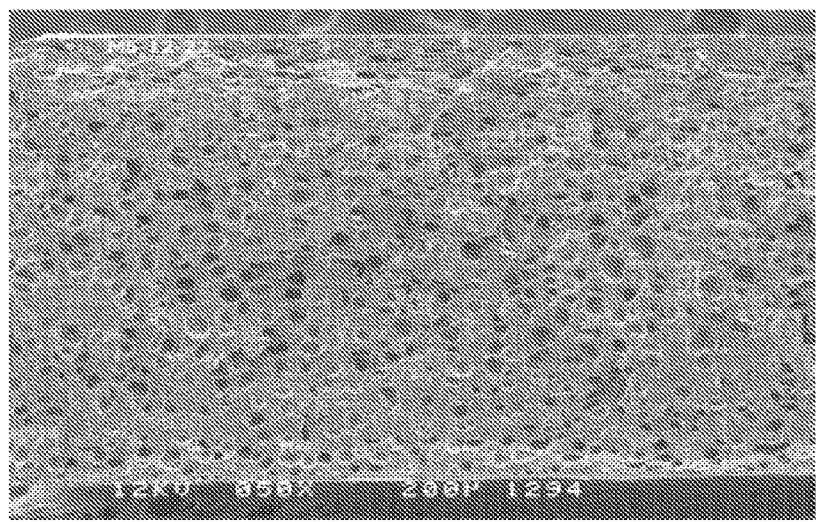
FIG. 41 shows a polypropylene foam with 4.8% additive of 27 mincorn expanded perlite with a cell size of 45 microns.

Particles of Type V result in medium penetration into the boundary layer. Type V particles create medium kinetic mixing of the boundary layer similar to a leaf rake on dry ground. Type five particles have excellent adhesive forces to the gluey region to the boundary layer, which is required for two-phase boundary layer mixing. Particle Type V produces minimal dispersion of additives, therefore increases fluid flow and will tend to stay in suspension. Some hollow or solid semi-spherical clustering material with aggressive surface morphology, e.g., roughness, groups, striations and hair-like fibers, promote excellent adhesion to the boundary layer with the ability to roll freely and can be used in low viscosity fluids and phase change materials, e.g., liquid to a gas and gas to a liquid. They possess the desired surface characteristics to promote boundary layer kinetic mixing.

Referring now to FIGS. 31A and 31B, shown is a scanning electron micrograph of solid residues (31A) and a scanning electron micrograph and energy dispersive spectroscopy (EDS) area analysis of zeolite-P synthesized at 100 C. Unlike the cluster materials discussed in particle type IV, these materials have a spherical shape and a surface roughness that may be created by hair-like materials protruding from the surface of the particles. Image (a) shows a particle that possesses good spherical characteristics. A majority of the spheres have surface roughness that is created by small connecting particles similar to sand grains on the surface. Image (b) shows a semi-circular particle that has hair-like fibers protruding from the entire surface. These characteristics promote good adhesion to the boundary layer but not excellent adhesion. These materials must roll freely on the surface of the boundary layer to produce minimal mixing to promote kinetic boundary layer mixing in a two-phase system. For example, as a liquid transitions to a gas in a closed system the boundary layer is rapidly thinning. The particles must stay in contact and roll to promote kinetic boundary layer mixing. The material also must have the ability to travel within the gas flow to recycle back into the liquid to function as an active medium in both phases. These particles have a preferred size range of between approximately between 1μ to 5μ (FIG. 31A) and from between approximately 20μ to 40μ (FIG. 31B). They both would work well in a high pressure steam generation system where they would move the stagnant film on the walls of the boiler from conduction toward a convection heat transfer process.

Particle Type VI

Referring now to FIGS. 31A, B, C, shown are nanostructured CoOOH hollow spheres that are versatile precursors for various cobalt oxide datives (e.g. Co3O4, LiCoO2) and also possess excellent catalytic activity. CuO is an important transition metal oxide with a narrow bandgap (e.g., 1.2 eV). CuO has been used as a catalyst, a gas sensor, in anode materials for Li ion batteries. CuO has also been used to prepare high temperature superconductors and magnetoresistance materials.

Referring now to FIGS. 33A, B, shown is a 2.5 μm uniform plain Al2O3 nanospheres (FIG. 33A) and 635 nm uniform plain Al2O3 nanosphers having hair-like fibers on the surface.

Referring now to FIG. 34, shown is a computer generated model that shown hair-like fibers that promote boundary layer adhesion so that nano-sized particles will stay in contact with the boundary layer while rolling along the boundary layer and producing kinetic mixing.

Dispersion Properties of Boundary Layer Kinetic Mixing Particles

The kinetic boundary layer mixing technology has excellent dispersion capabilities illustrated by FIGS. 36 and 37.

FIG. 36 shows a rigid PVC with the same pigment loading in both samples. It can clearly be seen that left sample having the kinetic boundary layer mixing particles therein is dispersed better.

FIG. 37 shows polycarbonate with the same pigment loading in both samples. It can clearly be seen that the one that the sample on the right includes the kinetic boundary layer mixing particles and is dispersed better.

FIGS. 36 and 37 clearly illustrate the benefits of kinetic boundary layer mixing particles in relationship to dispersion. The improved dispersion properties allows hydraulic fracturing fluids to have less additives because the presence of kinetic mixing fluid disburses the additives better, thereby producing the same beneficial properties of an additive.

Mixing and Blending of Dissimilar Materials

FIG. 38 shows two images. Image 1 shows rigid PVC with ABS spots. These two materials, even under high shear conditions chemically do not want to mix or blend together.

Image 2 of FIG. 38 shows the effect the adding kinetic boundary layer mixing particles on dissimilar hard to mix materials. In the extruder, the PVC and ABS mixed together, which resulted in the ABS acting like a black pigment.

The improved mixing will permit the hydraulic fracturing industry to trying new additives that are more environmentally friendly and that were previously unsuitable due to failure to sufficiently mix or blend into their hydraulic fracturing fluid.

Foam Nucleating Improvement.

The kinetic boundary layer mixing material can function as a highly specialized structural material. For example, sharp edged particles, when they are incorporated with a foaming agent, provide kinetic mixing that does not stop when the mixing step is done. The particles continue to remain active as the fluid moves during the expansion process. This promotes better dispersion of the blowing agents as well as increased mobility through better dispersion of reactive and nonreactive additives throughout the fluid during expansion of the foam thereby improving cellular consistency. The unique characteristics of three-dimensional, pointed, blade-like structures of the kinetic mixing material produces excellent nucleation sites, thereby increasing cellular wall consistencies and strength. One type of hydraulic fracturing fluid is foam. Kinetic boundary layer mixing particles will allow the foam to flow better and produce higher pressures down the wellbore because of more uniform micro cellular structures. This phenomenon can be seen by comparing polypropylene foam with no additive (FIG. 40) and polypylen foam with 4.8% additive of 27 micron expanded perlite (FIG. 41). FIG. 41 shows a substantial improvement in producing micro cell structures.

One difficulty associated with drilling fluids is the tendency for differential sticking to occur. Kinetic mixing particles can be used to reduce the tendencies of differential sticking and to reduce the tendency of clay solids to adhere to metal surfaces and to each other. Accretion testing and dynamic filtration testing was conducted. The accretion test was conducted to assess a tendency of reactive solids to adhere to each other and to metal surfaces, such as a bit and drill string. The result of the test materials were compared to the base drilling fluid without any kinetic mixing particles. Dynamic filtration studies are typically conducted to determine how the circulation rate affects high temperature, high pressure filtration rates. In this case, the testing showed that varying the circulation rate will cause a corresponding increase in filtration and a thinner filter cake as the concentration of the test materials was increased.

The procedure used involved incorporating kinetic mixing material at 3 concentrations in a typical lignite/lignosulfonate drilling fluid. The base fluid had the following formulation:

| | |
|---|---|
| Tapwater.bbls | 0.84 |
| Bentonite.lb/bbl | 20 |
| Lignosulfinate.lb/bbl | 4 |
| Lignite.lb/bbl | 4 |
| Caustic Sode.lb/bbl | Tp pH of 9.5 to 10.5 |
| Barite.lb/bbl | 178.5 |

The base fluid was hot rolled at 150° for 16 hours to stabilize the properties prior to use in the testing. After hot roll, the base mud had a yield point of 9 lbs/100 ft$^2$. The base mud was then split into 4 aliquots and incorporated into the fluids using a Silverson Mixer. The Silverson Mixer was used to impart high shear and to develop the temperature needed to incorporate the lubricant into the base fluids. The fourth aliquot served as the base. These fluids were then used in the accretion and Dynamic Filtration tests.

Accretion Test

Each test fluid was loaded with 100 lb/bbl of Pierre Shale, which is a moderately reactive shale, and placed in individual hot roll cells. Clean, tared mild steel rods were placed in each cell and the cells were sealed. The cells were then hot rolled at 150° F. for 16 hours. After hot rolling, the cells were cooled to room temperature and the rods carefully removed, gently cleaned with IPA, dried at 105° C. for 4 hours and reweighed. The accretion results were calculated from this information. The results follow:

| | BASE | Ecopuro Boundary Breaker | | |
|---|---|---|---|---|
| Sample Concentration, g | 0 | 0.5 | 1.0 | 3.0 |
| Rod Surface Area, in$^3$ | 4.54 | 4.46 | 4.54 | 4.45 |
| Clay Retained on Rod, g/n$^3$ | 0.397 | 0.387 | 0.333 | 0.317 |
| Improvement from Base, % | — | 2.52 | 16.12 | 20.15 |

Dynamic Filtration Test

An OFI Dynamic filtration apparatus was used for these tests. Each test fluid was placed in a dynamic filtration cell and tested at 3 different rpm values. It was hoped that the filtration rates would be higher and the filter cakes would be thinner thereby showing that the solids did not have a tendency to stick to each other. Filtration test parameters were 600 psi, differential pressure and 250° F. for 30 minutes. The filtration tests were run at 100 rpm, 300 rpm and 500 rpm. The results follow:

| | BASE | Ecopuro Boundary Breaker | | |
|---|---|---|---|---|
| Sample Concentration, g | 0 | 0.5 | 1.0 | 3.0 |
| Filtrate @ 100 rpm, ml | 4.8 | 3.6 | 3.6 | 4.0 |
| Filtrate @ 300 rpm, ml | 3.8 | 4.3 | 4.2 | 3.8 |
| Filtrate @ 500 rpm, ml | 3.8 | 4.2 | 4.2 | 3.6 |

Further research indicates that this testing shows that a type I kinetic mixing particle from expanded perlite around 20μ can reduce process surface adhesion by 20%. This will result in the reduction of energy in drilling fluids which use bentonite clay. This also clearly shows by moving the boundary layer of a thick viscous material from italic surfaces can reduce of wall caking.

The fundamental shapes of porous materials similar to expanded perlite or pumice, or spherical material such as glass beads or volcanic ash spheres, create highly specialized shapes when crushed. Expanded perlite and pumice materials both exhibit bubble-like structures. The structures are strongest at the intersection of the bubbles so the structures crack and break at the weakest point, which is along the bubble walls. Therefore, when the bubble-like structures are fractured, structures with three-dimensional bladelike shapes (see, e.g., Particles Type I, FIGS. 10-17) are produced. These bladelike structures of kinetic mixing material 20 produce mechanical wedging between the interface of proppant grains 24.

Hollow spheres, e.g., Particles Type II, shown in FIGS. 18-21B, may also be used as kinetic mixing material 20. When hollow spheres undergo crushing during a milling process, or the drilling bore well pressures reach 4000 psi or higher, the crushed or cracked particles produce semi-curved, egg-shaped structures that act as a mechanical wedge between proppant portions. These shaped structures will increase bonding between proppant grains 24 by a mechanical interlocking that resembles placing doorstops or wedges between every proppant grain 24, therefore increasing static friction between proppant grains 24. Therefore, individual grains of proppant 24 become mechanically interlocked by increasing the friction between proppant grains 24, thereby preventing proppant grains 24 from rolling or moving when pressure is applied. This allows for a larger, more stable fracture to be formed. Additionally, The bladelike structure of the lightweight kinetic mixing material 20 allows the mixing material to flow into regions of the formation fracture that had no prior flow.

The load-bearing dynamics of mechanical forces applied to semi spherical particles, such as proppant grains 24, are unique, because the particles 24 are allowed to move against one another to relieve the load bearing stresses, which produces random columns of load-bearing points where the friction among particles are semi-stable. The addition of kinetic mixing material 20 reduces the ability of the semi-spherical proppant particles 24 to roll by adding mechanical friction between the interfaces of the proppant particles 24, thereby increasing the load-bearing capabilities of the proppant 24. When the load-bearing proppant particles 24 are interlocked, a more uniform load bearing strength is produced over the entire fracture thereby reducing proppant crushing and increasing stabilization of the fracture.

Lower Drag with Proppant Slurry

The boundary layer is the area of the highest drag of a fluid. The boundary layer occurs at all fluid interfaces with fixed objects or surfaces. Kinetic mixing material 20 is designed to move the boundary layer of a flowing fluid which results in friction reduction in semi-viscous material or heavily filled materials such as proppant slurry. Kinetic mixing material 20 functions kinetically, i.e., the higher the fluid flow velocity, the better kinetic mixing material 20 performs to reduce friction; thereby increasing the penetration of a slurry into a fracture formation. As the fluid velocity slows down, kinetic mixing material 20 will migrate into the proppant slurry creating an interlocking matrix.

The kinetic mixing material will help meet current and anticipated environmental regulatory requirements by reducing the use of certain toxic additives and replacing the toxic additives with an environmentally friendly, inert solid, i.e., kinetic mixing material, that is both chemically and thermally stable.

Typical proppant particle sizes are 20 mesh, i.e., 841 micron to 40 mesh, i.e., 400 micron and 70 mesh, i.e., 210 micron. Sizes of kinetic mixing material particles 20 to reduce flow back of proppant 24 and increase fracture stability is from $1/32$ to $1/4$ of the proppant size unless the mixing material is self-shaping, which enables larger particle sizes because the particles will change geometrical shapes based on operating conditions.

| For example: | $1/32$ | $1/4$ |
|---|---|---|
| 20 mesh i.e., 841µ: | 26µ | 210µ |
| 40 mesh, i.e., 400µ: | 12µ | 100µ |
| 70 mesh, i.e., 210µ: | 7µ | 52µ |

In one embodiment, kinetic mixing material 20 is perlite. There is a unique characteristic associated with perlite. Perlite can be added in expanded form without undergoing milling process depending on the depth of the well. Perlite has a unique self-shaping property, as illustrated by the FIGS. 10-17. Under pressure, perlite naturally decomposes to the appropriate shapes required to interlock the proppant particles 24. Therefore, perlite can either be milled to a designated size or allowed to undergo a self-shaping process where the wellbore pressures reach 4000 psi or higher. Expanded perlite's bubble fracture point is around 500 psi depending on process conditions during the expansion.

Kinetic mixing material 20 may be mixed into a proppant slurry as a dry powder either as expanded bubbles which will self-shape or as a pre-process milled version of a designated size. Kinetic mixing materials 20 may be added in at percentages ranging from 0.5% to 85% by weight fluid prior to addition of proppant 24.

Kinetic mixing material 20 used for kinetic mixing in boundary layer of fracture fluid has the following characteristics:

The physical geometry of particles 20 should have a characteristic that allows particle 20 the ability to roll or tumble along the boundary layer of flowing fracture fluid.

Particles 20 may be irregularly shaped, e.g., partial spheres resulting from crushed bubble shapes or other irregular shapes that form natural flow channels to facilitate fracture fluid flow.

The mixing efficiency of particles 20 increases with surface roughness to interact with zero velocity zone or non-slip polymer surface to promote kinetic friction rather than static friction.

Particles 20 should be sufficiently hard so that the hydraulic fracturing fluid is deformed around particle 20 to promote kinetic mixing through the tumbling or rolling effect of particle 20.

Particles 20 should be size proportional to the boundary layer of the hydraulic fracturing fluid being used so that particles 20 roll or tumble using kinetic rolling friction so that particles 20 are not drug within the boundary layer of the fluid. Dragging particles 20 within the boundary layer increases negative effects of the boundary layer based on increased surface roughness, thereby restricting flow, or can produce the removal of particle 20 from the boundary layer of hydraulic fracturing fluid into the bulk fluid.

Particles 20 should be able to reconnect in the boundary layer of the hydraulic fracturing fluid layer from the bulk fluid during the mixing process based on particle size and surface roughness.

Particles 20 can be solid or porous materials, manmade or naturally occurring minerals and or rocks.

Particles 20 for use in the method of the invention must have desirable surface characteristics. One embodiment of desirable surface characteristics is sharp edges. Sharp edges may be formed on particles by a jet mill process. During a jet mill process, particles strike each other to form a sharp edge via a conchoidal fracture. Even though some particle size selections will produce different effects depending on the fluid selection, it is the edge effect that produces the desired performance.

Materials that will produce sharp edge effects upon jet milling include: pumice, Perlite, volcanic glass, sand, flint, slate and granite in a variety of other mineable materials. There are a variety of man-made materials, such as steel, aluminum, brass, ceramics and recycled and/or new window glass. These materials can be processed either by jet milling or by other related milling processes to produce a sharp edge with small particle sizes. Nano materials are ideally suited for producing kinetic boundary layer mixing particles. In addition to the listed examples, other materials may also be suitable, provided the materials have sufficient hardness, estimated to be 2.5 on the Mohs hardness scale.

A variety of materials having a hardness greater than 2.5 will work as likely candidates to produce sharpened edge effects. These materials, therefore, are likely candidates for the kinetic mixing particles relating to the boundary layer. The materials are also likely candidates for structural filler to be incorporated in plastics, polymers, paints, adhesives, oils, gases and process fluids. The Mohs hardness scale, showing the hardness of a variety of materials, is presented below:

| Hardness | Mineral | Absolute Hardness |
|---|---|---|
| 1 | Talc ($Mg_3Si_4O_{10}(OH)_2$) | 1 |
| 2 | Gypsum ($CaSO_{4.2}H_20$) | 2 |
| 3 | Calcite ($CaCO_3$) | 9 |
| 4 | Fluorite ($CaF_2$) | 21 |
| 5 | Apatite ($Cas(PO_4)_3(OH—, Cl—, F—)$) | 48 |
| 6 | Orthoclase Feldspar (KA1Si308) | 72 |
| 7 | Quartz ($SiO_2$) | 100 |
| 8 | Topaz ($Al_2SiO_4(OH—Y—)_2$) | 200 |
| 9 | Corundum ($Al_2O_3$) | 400 |
| 10 | Diamond (C) | 1500 |

The mixing efficiency of a particle is increased when surface dynamic characteristics of the particle are increased. Examples of particle surface dynamic characteristics include characteristics such as sharp bladelike edges as may result from concoidal fractures, smooth surfaces, surface roughness or surface morphology, three-dimensional needlelike shapes and thin curved surfaces. Increasing surface dynamic characteristics has a twofold effect. The first effect is that surface characteristics and particle geometry of a particle having increased surface dynamic characteristics enhance surface adhesion to the nonslip zone or the sticky or gluey region of the boundary layer, which produces resistance to particle rolling or tumbling. The second effect of increasing surface dynamic characteristics is an increased resistance of the ability of the particle to roll and tumble, which results in stronger mechanical interaction with the impacting fluid. Therefore, if the material dynamic surface characteristics are increased, then dynamic mixing is increased, which increases cohesion forces in the sticky/gluey region. Increased rotational resistance is then promoted, which increases the cutting or chopping effects of sharp bladelike particle surface features. The ability to grind and cut during particle tumbling or rotation produces kinetic boundary layer mixing.

Images Showing Particles Exhibiting Fracture.

Example materials include ash, expanded perlite, recycled glass that exhibit conchordial fractures that produce sharp edges. Other example materials include ash, expanded perlite, recycled glass having sharp bladelike edges.

A variety of materials have the ability to fracture. For example, striated or vitreous minerals are not good candidates because they propagate fractures on striation lines, which limits their ability to produce sharp bladelike characteristics. As an example, Alternatively, minerals such as flint and obsidian do not fracture along striation lines. As a result, historically these minerals have been useful for making objects with sharp edges, e.g., arrowheads, spearheads, knives and even axes.

Other examples include ash, expanded perlite, and recycled glass having smooth edges.

A smooth edge on a knife blade lowers the resistance to creating a cut as well as lowering an amount of force required to be applied to the holding device. The same principle is applicable to sharp smooth edges of particles 20, which allow kinetic mixing to take place while particle 20 remains in a boundary layer, tumbling or rolling along the sticky or gluey region. If the surface of particle 20 is sharp and rough, then resistance due to the surface roughness will be enough to remove particle 20 from the boundary layer by overcoming cohesive forces produced by the sticky or gluey region.

Therefore, particles 20 with sharp, smooth, bladelike characteristics can remain in a boundary layer to promote kinetic mixing.

Other examples include ash, expanded perlite, and recycled glass having a complex surface geometry, such as blade-like characteristics with dynamic curves to promote surface adhesion in the stick or gluey region.

A complex, three-dimensional surface area of a particle is sufficient to promote tumbling or rolling. The above referenced images that show the ash and the expanded perlite clearly shows complex surface geometry characteristics used for kinetic mixing in the boundary layer.

Other examples include ash, expanded perlite, and recycled glass having needle-like points and curves.

Three-dimensional, smooth needle-like tips interact with a boundary layer by protruding into the moving fluid region adjacent to the boundary layer to promote tumbling or rolling. The smooth needle-like characteristics create sufficient fluid force to produce particle rotation while minimizing cohesive forces applied by the deformation of fluid flowing around the particle, thereby overcoming aerodynamic lift forces, which are not sufficient to remove the particle from the sticky or gluey region.

Other examples include ash, expanded perlite with surface curves, e.g., a thin smooth curved particle similar to an egg shell. The surface curves allow good adhesion to the sticky layer while promoting dynamic lift on the curved thin particle. The dynamic lift promotes rotation, thereby producing kinetic mixing in the boundary layer. Expanded perlite may exhibit thin surface curves for producing kinetic mixing in the boundary layer.

Other examples include reactive particle shaping of porous materials, such as unprocessed ash spheres, processed ash, course processed expanded perlite, and finely processed expanded perlite.

These previously mentioned materials, because of their unique surface characteristics, such as thin curved walls, smooth bladelike shapes and three-dimensional surface geometry, as well as a Mohs scale hardness of at least 2.5 have the ability to change their physical particle size under high pressure while maintaining the dynamic surface characteristics discussed above to achieve kinetic boundary layer mixing. For example, particles that are too large can be swept off the boundary layer into the main fluid where the particles can undergo fracturing produced by high pressure and fluid turbulence, thereby reducing their particle size. Particles having an appropriate size after fracturing will tend to migrate towards the boundary layer where the particles will come in contact with the sticky or gluey region to promote kinetic boundary layer mixing. Particle sizing may also take place in the boundary layer against mechanical surfaces caused by fluid impacting pressures. While undergoing fracturing, the thin smooth walls produce sharp knifelike blade characteristics regardless of the fracture point and regardless of the hardness of the material. This helps maintain three-dimensional surface characteristics to promote tumbling or rolling in the boundary layer.

Particle Hardness and Toughness:

Mixing blades and high shear mixing equipment are usually made of hardened steel. Polymers are softer when mechanical agitation is applied during mixing. Since particles added to a polymer pass through the equipment, the particles need to have an ability to retain their shape for the particles to function properly. Chemical interactions between molecules have been tested and organized based on their hardness. A minimal hardness of 2.5, starting with copper on the Mohs scale, or harder is sufficient for a single pass particle to be tough enough for this mixing process.

Additive Loading Suggestions 0.5 percent by formula weight and increase until desired results are achieved or one or more of the expected outcomes are obtained.

Expected Outcomes

When used with plastics, particles of Type I or III resulted in decreased energy use, increased throughput, better surface quality, increased dispersion of additives and an ability to lower process temperatures and maintain production.

When used with fluid polymers, particles of Type I or III resulted in increased dispersion times of additives, a decrease in additives needed, decrease in energy uses during agitation, better surface interaction, better mixing between plural component materials.

When used with simple fluids, particles of type I or III resulted in increased dispersion times of additives, decrease in additives needed, decreased energy uses during agitation, and better surface interaction.

When used with oils, particles of type I or III resulted in an increase in fluid flow, a decrease in viscosity, and in self-cleaning of mechanical surfaces. The invention relies on the fundamental principle of kinetically moving the boundary layer of a fluid. Particle geometry selection and particle size selection are skills needed by someone skilled in the art to utilize this technology with a variety of formulations. Therefore, the details related to millions of current formulations in the chemical and polymer fields will not be fully discussed herein. Fluid viscosity is affected by temperature, additives, polymers, chain links, reactions, and mixing, which all directly affect the boundary layer thickness. The invention relates to a starting point for selecting particle characteristics and general fluid selection from a variety of polymers to produce the ability to kinetically move or interact with the boundary layer.

* * *

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method of hydraulically fracturing a formation comprising the steps of:
   forming a blend of kinetic mixing material and a carrier fluid, wherein said kinetic mixing material is comprised of particles wherein at least 25% have a complex three-dimensional surface area having a sharp surface;
   injecting said blend into a well;
   dispersing said kinetic mixing material by boundary mixing on large surfaces in said well;
   hydraulically fracturing a formation;
   penetrating said hydraulically fractured formation with said kinetic mixing material; wherein the kinetic mixing material is comprised of perlite.

2. The method according to claim 1 wherein said kinetic mixing material is comprised of:
   particles having thin walls.

3. The method according to claim 1 wherein said kinetic mixing material is comprised of:
   particles defining three dimensional blade shapes.

4. The method according to claim 1 wherein said kinetic mixing material is comprised of:
   particles having slightly curved thin walls.

5. The method according to claim 1 wherein said kinetic mixing material is comprised of:
   crushed hollow spheres.

6. The method according to claim 1 wherein said kinetic mixing material is comprised of:
   particles having corners defined by planes intersecting at 90° or less.

7. The method according to claim 1 wherein said kinetic mixing material is comprised of:
   particles having conglomerated protruding arms.

8. The method according to claim 1 wherein said kinetic mixing material is comprised of:
   semi-spherical material having hair-like fibers protruding from a surface of said material.

9. The method according to claim 1 wherein said kinetic mixing material is comprised of:
   particles having a Mohs hardness value of greater than 2.5.

10. The method according to claim 1 wherein:
    said complex three-dimensional surface comprises needle-like shapes.

11. The method according to claim 1 wherein:
    said perlite is added to said carrier fluid at percentages from 0.05% to 85% by weight of said blend.

12. The method according to claim 1 wherein:
    said kinetic mixing material is in a fluidized slurry.

13. The method according to claim 1 further comprising the step of:
    forming a mixture of said kinetic mixing material and an additive formulation before said step of forming a blend.

14. The method according to claim 13 wherein:
    said mixture comprises 0.05% to 85% by formula weight of said kinetic mixing material.

15. The method according to claim 13 wherein:
    said additive formulation is a polymer.

16. The method according to claim 15 wherein:
    said polymer is selected from a group consisting of a cross-linked water based fluid, an oil based fluid, an oil-in-water emulsion, and a foam.

17. The method according to claim 13 wherein:
    said step of forming a mixture comprises introducing said kinetic mixing material and said additive formulation into a mixer, wherein said mixer is a turbine blade system or an impeller system.

18. The method according to claim 13 wherein:
    said step of forming a mixture comprises introducing said kinetic mixing material and said additive formulation into a mixer, wherein said mixer is a shear system.

19. The method according to claim 18 further comprising the steps of:
    adjusting a size of said kinetic mixing material to form a particle of a desired size during said step of forming a mixture.

20. The method according to claim 18 wherein:
    said step of forming a mixture comprising homogenizing said kinetic mixing material and said additive formulation to form an emulsion.

21. The method according to claim 13 wherein:
    said step of forming a mixture comprises introducing said kinetic mixing material and said additive formulation into a mixer, wherein said mixer is an impingement system.

22. The method according to claim 21 further comprising the steps of:
adjusting a size of said kinetic mixing material to form in particles of a desired size during said step of forming a mixture.

23. The method according to claim 1 wherein:
said step of forming a blend comprises introducing an additive formulation into said carrier fluid by mechanical shear.

24. The method according to claim 1 wherein said step of forming a blend comprises:
said step of forming a blend comprises introducing an additive formulation and said carrier fluid into an in-line shear mixing system.

25. The method according to claim 24 wherein:
said in-line shear mixing system includes a recycle loop for recycling said blend through said in-line shear mixing system until desired dispersion is achieved.

26. The method according to claim 1 further comprising:
adding a proppant to said blend before said step of injecting.

27. The method according to claim 26 further comprising:
modifying said proppant before said step of adding to impart desired characteristics of said kinetic mixing material.

28. The method according to claim 27 wherein:
said proppant is comprised of 0.5% to 100% of roller milled Frac Sand.

29. The method according to claim 1 wherein:
said kinetic mixing material particles sizes are between $\frac{1}{32}$ to $\frac{1}{4}$ of a diameter of a proppant.

30. The method according to claim 29 wherein:
said particle sizes are achieved by shaping said particles with process pressure.

* * * * *